(12) United States Patent
Endo et al.

(10) Patent No.: US 8,168,313 B2
(45) Date of Patent: May 1, 2012

(54) GLASS FOR INFORMATION RECORDING MEDIUM SUBSTRATE, GLASS SUBSTRATE FOR INFORMATION RECORDING MEDIUM AND MAGNETIC DISK

(75) Inventors: Jun Endo, Chiyoda-ku (JP); Tatsuo Nagashima, Chiyoda-ku (JP); Tetsuya Nakashima, Chiyoda-ku (JP); Manuel Diaz Reyes, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/724,570

(22) Filed: Mar. 16, 2010

(65) Prior Publication Data

US 2010/0255350 A1  Oct. 7, 2010

(30) Foreign Application Priority Data

Apr. 2, 2009  (JP) ................. 2009-090104
Feb. 15, 2010  (JP) ................. 2010-030190

(51) Int. Cl.
 G11B 5/73  (2006.01)
 C03C 3/085  (2006.01)
 C03C 3/087  (2006.01)
(52) U.S. Cl. ............ 428/846.9; 428/64.2; 360/135; 501/69; 501/70
(58) Field of Classification Search ............ 428/426, 428/846.9, 847.7, 848, 64.2, 1.62, 579, 64.1, 428/692.1; 501/66, 69, 70, 55, 62, 68; 65/292; 360/135, 136
See application file for complete search history.

(56) References Cited

U.S. PATENT DOCUMENTS

| | | |
|---|---|---|
| 5,900,296 A | 5/1999 | Hayashi et al. |
| 6,251,812 B1 | 6/2001 | Koyama et al. |
| 6,333,286 B1 | 12/2001 | Kurachi et al. |
| 6,365,534 B1 | 4/2002 | Koyama et al. |
| 6,818,576 B2 | 11/2004 | Ikenishi et al. |
| 7,090,937 B2 | 8/2006 | Ikenishi et al. |
| 7,208,238 B2 | 4/2007 | Ikenishi et al. |

(Continued)

FOREIGN PATENT DOCUMENTS

JP  11-79782  3/1999

(Continued)

OTHER PUBLICATIONS

U.S. Appl. No. 12/959,726, filed Dec. 3, 2010, Endo, et al.

(Continued)

Primary Examiner — Kevin M. Bernatz
Assistant Examiner — Louis Falasco
(74) Attorney, Agent, or Firm — Oblon, Spivak, McClelland, Maier & Neustadt, L.L.P.

(57) ABSTRACT

A glass for an information recording medium substrate, which comprises, as represented by mol % based on the following oxides, from 61 to 72% of $SiO_2$, from 3 to 11% of $Al_2O_3$, from 0 to 14.3% of $Li_2O$, from 0 to 22% of $Na_2O$, from 0 to 22% of $K_2O$, from 4 to 13% of MgO, from 0 to 6% of $TiO_2$ and from 0 to 5% of $ZrO_2$, provided that the total content of $Li_2O$, $Na_2O$ and $K_2O$ ($R_2O$) is from 10 to 22%, and (a) the ratio of the content of $Li_2O$ to $R_2O$ ($Li_2O/R_2O$) is at most 0.52, (b) the ratio of the content of $Na_2O$ to $R_2O$ ($Na_2O/R_2O$) is at least 0.35, or (c) the ratio of the content of $K_2O$ to $R_2O$ ($K_2O/R_2O$) is at least 0.45.

20 Claims, 2 Drawing Sheets

U.S. PATENT DOCUMENTS

| | | |
|---|---|---|
| 7,273,668 B2 | 9/2007 | Kurachi et al. |
| 7,396,788 B2 | 7/2008 | Kawai et al. |
| 2003/0031878 A1* | 2/2003 | Mitani et al. .................. 428/426 |
| 2004/0180239 A1* | 9/2004 | Ikenishi et al. ............ 428/846.9 |
| 2004/0214047 A1* | 10/2004 | Kawai ........................ 428/846.9 |
| 2005/0079391 A1 | 4/2005 | Ikenishi et al. |
| 2005/0215414 A1 | 9/2005 | Kawai |
| 2006/0205584 A1* | 9/2006 | Ikenishi et al. ................. 501/66 |
| 2009/0110963 A1 | 4/2009 | Nakashima et al. |
| 2009/0220824 A1 | 9/2009 | Ikenishi et al. |
| 2009/0239035 A1 | 9/2009 | Nagai et al. |
| 2009/0239102 A1 | 9/2009 | Nagashima et al. |
| 2010/0035745 A1* | 2/2010 | Murata .......................... 501/66 |
| 2010/0330396 A1 | 12/2010 | Nakashima et al. |

FOREIGN PATENT DOCUMENTS

| | | |
|---|---|---|
| JP | 11-232628 | 8/1999 |
| JP | 2000-357318 | 12/2000 |
| JP | 2002-29774 | 1/2002 |
| JP | 2002-358626 | 12/2002 |
| JP | 2004-277230 | 10/2004 |
| JP | 2004-277232 | 10/2004 |
| JP | 2006-290704 | 10/2006 |
| WO | WO 2008/062847 A1 | 5/2008 |

OTHER PUBLICATIONS

U.S. Appl. No. 12/909,423, filed Oct. 21, 2010, Endo, et al.

U.S. Appl. No. 12/909,221, filed Oct. 21, 2010, Endo, et al.

Search Report and Written Opinion issued Aug. 19, 2010, in Singaporean Patent Application No. 2010018836 filed on Mar. 18, 2010.

U.S. Appl. No. 13/271,322, filed Oct. 12, 2011, Endo, et al.

* cited by examiner

GLASS FOR INFORMATION RECORDING MEDIUM SUBSTRATE, GLASS SUBSTRATE FOR INFORMATION RECORDING MEDIUM AND MAGNETIC DISK

The present invention relates to glass to be used for an information recording medium substrate such as a magnetic disk (hard disk), a glass substrate for an information recording medium and a magnetic disk.

Glass substrates are widely used as substrates for information recording medium, particularly for magnetic disks, and a commercially available glass substrate has been known, which has a composition comprising, as represented by mol %, $SiO_2$: 65.4%, $Al_2O_3$: 8.6%, $Li_2O$: 12.5%, $Na_2O$: 10.5% and $ZrO_2$: 3.0%. This commercially available glass is subjected to chemical strengthening treatment for use.

On the other hand, Patent Document 1 proposes a substrate glass for a magnetic disk, which is not subjected to chemical strengthening treatment.

Patent Document 1: JP-A-2002-358626 (Tables 1 to 14)

Since an acid having a low pH is used in a step of polishing or washing a glass substrate for a magnetic disk, the glass substrate for a magnetic disk is required to be free from surface roughening in the polishing step or washing step at a low pH, i.e. to have acid resistance. Further, by using an acid having a low pH, it is possible to improve the polishing rate or the performance to remove defects in the washing step. However, in the case of glass having poor acid resistance, if an acid having a low pH is used, the polishing rate becomes low, or defects tend to remain after washing to deteriorate the quality.

A glass substrate for a magnetic disk is required to have a property such that a film such as a base film, a magnetic film or a protective film, which is formed on the substrate, is prevented from peeling due to remarkable change of a surface condition during storage, namely it is required to have weather resistance. Alkali metal components such as Li, Na and K are widely used as a glass melt accelerator. However, such components are selectively extracted from glass by moisture in air, and they are finally reacted with a component such as carbonic acid gas or sulfur dioxide gas in air and attach on a glass surface in the form of an alkali metal carbonate or an alkali metal sulfate (white stain). Therefore, it is required to prevent such a reaction.

Further, if an alkali metal component diffuses to a magnetic film, a phenomenon such that recorded information is erased tends to occur. Therefore, there is a problem that reliability of recording medium is impaired.

The present inventors conducted the after-mentioned weather resistance test on the above-mentioned commercially available chemically strengthened glass, and the result was that the total precipitation amount $C_R$ of Li, Na and K was 3.5 nmol/cm², (after-mentioned Example 123). With one not chemically strengthened, $C_R$ was 18.3 nmol/cm² (after-mentioned Example 124). With one not chemically strengthened, the weather resistance was low, and it is evident that the weather resistance can be improved by the chemical strengthening treatment. That is, it is considered that this glass can be made useful as a glass substrate for a magnetic disk for the first time by the chemical strengthening treatment, and the reason is considered to be such that the amount of an alkali component having a large ion radius increases on the glass surface along with the chemical strengthening treatment, and the mobility is reduced. However, there are problems such that the chemical strengthening treatment increases the number of manufacturing steps, thus leading to an increase of cost, and the substrate surface tends to be stained by the chemical strengthening treatment.

On the other hand, most of the compositions exemplified in Patent Document 1 contain at least 1 mol % of $B_2O_3$ in addition to an alkali metal component. $B_2O_3$ is added in order to e.g. lower the brittleness of glass, lower the specific gravity or improve the melting property of glass. However, if $B_2O_3$ coexists with an alkali metal component, an alkali metal borate compound having an extremely low vapor pressure is formed, and the alkali metal borate component volatilizes and diffuses from the glass melt vigorously.

FIG. 1 shows a vapor pressure curve of a boron compound calculated from thermodynamic data disclosed in Malcolm W. Chase, Jr., NIST-JANAF Thermochemical Tables, (U.S.A.), fourth edition, the American Chemical Society and American Institute of Physics, Year 1998, p. 242-274. Vapor pressure P was calculated from the free energy difference $\Delta G$ between gas phase and condensed phase at each temperature by the following formula. Results are shown on FIG. 1.

$$\Delta G = RT \ln P$$

Here, R is a gas constant.

It is evident from FIG. 1 that the vapor pressure of the alkali compound of boron is by far higher than that of $B_2O_3$. Due to such a phenomenon, non-homogeneity such as striation occurs, and the quality of glass deteriorates, and at the same time, there are problems such that volatized materials are condensed on refractories used for a glass melting furnace, and the refractory strength is thereby substantially lowered, and enormous cost is required to recover the volatized substances.

Further, in order to study the influence of the content of $B_2O_3$ on volatilization of alkali metal components from glass, each glass of the after mentioned Examples 29, 137 and 138 was put in a platinum crucible and left for 23 hours at 1,600° C., and the amount of $Li_2O$ and the amount of $Na_2O$ in the glass were analyzed by ICP-MS before and after leaving it in the platinum crucible. Further, the contents of $B_2O_3$ in the glass of Examples 29, 137 and 138 were 0 mol %, 1 mol % and 1.5 mol %, respectively.

As a result, the reduced amounts of $Li_2O$ (absolute amounts) before and after leaving the glass of Examples 29, 137 and 138 in the platinum crucible were 0.0 mass %, 0.1 mass % and 0.1 mass %, respectively. The reduced amounts of $Na_2O$ (absolute amount) were 0.4 mass %, 0.8 mass % and 0.9 mass %, respectively. That is, between Example 29 wherein $B_2O_3$ was not contained and Examples 137 and 138 wherein at least 1 mol % of $B_2O_3$ was contained, the reduced amount of $Na_2O$ was remarkably different.

Further, in Patent Document 1, five examples of containing no $B_2O_3$ are shown. However, in each of such examples, the content of alkali metal components in glass was large, and $C_R$ was thereby considered to be at least 12 nmol/cm², and it is considered that alkali metals tend to diffuse into a magnetic film, and reliability is low. Further, the after mentioned Example 125 corresponds to the glass of Example 63 in Patent Document 1, and the after mentioned nitric acid etching rate was 181 nm/h. Therefore, it is likely that surface roughening results in a polishing or washing step at a low pH, and the quality deteriorates.

The present inventors have considered that such problems occur due to glass which shows a high nitric acid etching rate in the acid resistance test and a large amount of precipitation of alkalis in the weather resistance test. Thus, the present invention has been accomplished in order to solve such a problem without carrying out a chemical strengthening treatment and without incorporating a large amount of $B_2O_3$.

MEANS TO ACCOMPLISH PROBLEMS

The present invention provides glass for an information recording medium substrate, which comprises, as represented by mol % based on the following oxides, from 61 to 72% of $SiO_2$, from 3 to 12% of $Al_2O_3$, from 0 to 14.3% of $Li_2O$, from 0 to 22% of $Na_2O$, from 0 to 22% of $K_2O$, from 4 to 13% of MgO, from 0 to 6% of $TiO_2$ and from 0 to 5% of $ZrO_2$, provided that the total content of $Li_2O$, $Na_2O$ and $K_2O$ ($R_2O$) is from 8 to 22%, and the ratio of the content of $Li_2O$ to $R_2O$ ($Li_2O/R_2O$) is at most 0.52, the ratio of the content of $Na_2O$ to $R_2O$ ($Na_2O/R_2O$) is at least 0.35, or the ratio of the content of $K_2O$ to $R_2O$ ($K_2O/R_2O$) is at least 0.45. Here, for example "comprises from 0 to 14.3 of $Li_2O$" means that although $Li_2O$ is not essential, $Li_2O$ may be contained up to 14.3%.

Further, the present invention provides the above glass for an information recording medium substrate, wherein $Al_2O_3$ is from 3 to 11%, and $R_2O$ is from 10 to 22%.

Further, the present invention provides the above glass for an information recording medium substrate, wherein $SiO_2$ is from 62 to 71%, $Al_2O_3$ is from 4 to 10%, $Li_2O$ is from 0 to 13%, $Na_2O$ is from 0 to 20%, $K_2O$ is from 0 to 20%, MgO is from 5 to 12%, $TiO_2$ is from 0 to 5%, $ZrO_2$ is from 0 to 5%, and $R_2O$ is from 11 to 20%.

Further, the present invention provides the above glass for an information recording medium substrate, wherein $SiO_2$ is from 63 to 70%, $Al_2O_3$ is from 5 to 9%, $Li_2O$ is from 0 to 12.4%, $Na_2O$ is from 0 to 19%, $K_2O$ is from 0 to 19%, MgO is from 5 to 11%, $TiO_2$ is from 0 to 4%, $ZrO_2$ is from 0 to 4%, and $R_2O$ is from 13 to 19%.

Further, the present invention provides the above glass for an information recording medium substrate, which contains neither CaO, SrO nor BaO, which contains at least one of CaO, SrO and BaO in the total content of at most 3%, or which contains from 0 to less than 5% of $Li_2O$ and from more than 2% to 8% of CaO.

In the above glass, the first and second embodiments of glass, namely the glass for an information recording medium substrate, wherein the total content of CaO, SrO and BaO (CaO+SrO+BaO) is from 0 to 3% is preferred when it is desired to increase the specific modulus and the average linear expansion coefficient (hereinafter, glass of the first and second embodiments of glass is referred to as "glass A").

The glass of the third embodiment, namely the glass for an information recording medium substrate wherein $Li_2O$ is from 0 to less than 5%, and CaO is from more than 2% to 8% is preferred when it is desired to make the glass transition temperature to be high (hereinafter, the glass of the third embodiment is referred to as "glass B").

Further, the present invention provides glass for an information recording medium which contains no $B_2O_3$, or contains less than 1% of $B_2O_3$.

Further, the present invention provides a glass substrate for an information recording medium which is made of the above glass for an information recording medium substrate.

Further, the present invention provides a magnetic disk having a magnetic recording layer formed on such a glass substrate for an information recording medium.

Further, the present invention provides the followings including some of the above-mentioned features.

1. Glass for an information recording medium substrate, which comprises, as represented by mol % based on the following oxides, from 61 to 72% of $SiO_2$, from 3 to 12% of $Al_2O_3$, from 0 to 14.3% of $Li_2O$, from 0 to 22% of $Na_2O$, from 0 to 22% of $K_2O$, from 4 to 13% of MgO, from 0 to 6% of $TiO_2$ and from 0 to 5% of $ZrO_2$, provided that the total content of $Li_2O$, $Na_2O$ and $K_2O$ ($R_2O$) is from 8 to 22%, and the ratio of the content of $Li_2O$ to $R_2O$ ($Li_2O/R_2O$) is at most 0.52, the ratio of the content of $Na_2O$ to $R_2O$ ($Na_2O/R_2O$) is at least 0.35, or the ratio of the content of $K_2O$ to $R_2O$ ($K_2O/R_2O$) is at least 0.45.

2. The glass for an information recording medium substrate according to the above 1, wherein the ratio of $Li_2O/R_2O$ is at most 0.5, or the ratio of $Na_2O/R_2O$ is at least 0.4.

3. The glass for an information recording medium substrate according to the above 1 or 2, wherein the total content of $TiO_2$ and $ZrO_2$ ($TiO_2+ZrO_2$) is from 0 to 8%.

4. The glass for an information recording medium substrate according to any one of the above 1 to 3, which contains no $B_2O_3$ or contains less than 1% of $B_2O_3$.

5. The glass for an information recording medium substrate according to any one of the above 1 to 4, wherein the difference obtained by deducting the content of $Al_2O_3$ from the content of $SiO_2$ exceeds 53%.

6. The glass for an information recording medium substrate according to any one of the above 1 to 5, wherein the difference obtained by deducting the content of $Li_2O$ from the content of $K_2O$ is at most 9%.

7. The glass for an information recording medium substrate according to any one of the above 1 to 6, wherein $R_2O$ is at least 10%.

8. The glass for an information recording medium substrate according to any one of the above 1 to 6, wherein $SiO_2$ is from 62 to 71%, $Al_2O_3$ is from 4 to 12%, $Li_2O$ is from 0 to 12.4%, $Na_2O$ is from 0 to 20%, $K_2O$ is from 0 to 19%, MgO is from 5 to 12%, $TiO_2$ is from 0 to 5%, $ZrO_2$ is from 0 to 4%, and $R_2O$ is from 11 to 20%.

9. The glass for an information recording medium substrate according to any one of the above 1 to 8, wherein the content of $Al_2O_3$ is at most 11%.

10. The glass for an information recording medium substrate according to any one of the above 1 to 6, wherein $SiO_2$ is from 63 to 70%, $Al_2O_3$ is from 5 to 9%, $Li_2O$ is from 0 to 10.2%, $Na_2O$ is from 0 to 19%, $K_2O$ is from 0 to 12.8%, MgO is from 5 to 11%, $TiO_2$ is from 0 to 4%, $ZrO_2$ is from 0 to 4%, and $R_2O$ is from 13 to 19%.

11. The glass for an information recording medium substrate according to any one of the above 1 to 10, which contains neither CaO, SrO nor BaO.

12. The glass for an information recording medium substrate according to any one of the above 1 to 10, which contains at least one of CaO, SrO and BaO in the total content of at most 3%.

13. The glass for an information recording medium substrate according to any one of the above 1 to 6, wherein $Al_2O_3$ is from 3 to 11%, $Li_2O$ is from 0 to less than 5%, $Na_2O$ is from 0 to 13%, $K_2O$ is from 0 to 12%, MgO is from 4 to 11%, $R_2O$ is from 8 to 17%, and CaO is from more than 2% to 8%.

14. The glass for an information recording medium substrate according to any one of the above 1 to 6, wherein $SiO_2$ is from 61 to 71%, $Al_2O_3$ is from 4 to 11%, $Li_2O$ is from 0 to 4.5%, $Na_2O$ is from 0 to 12%, $K_2O$ is from 0 to 10%, MgO is from 4 to 9%, and CaO is from 2.5 to 7%.

15. The glass for an information recording medium substrate according to the above 13 or 14, wherein $ZrO_2$ is from 0.5 to 3%.

16. The glass for an information recording medium substrate according to any one of the above 1 to 15, which has a Young's modulus of at least 75 GPa and a specific modulus of at least 28 MNm/kg.

17. The glass for an information recording medium substrate according to any one of the above 1 to 16, which has a glass transition temperature of at least 500° C.

18. The glass for an information recording medium substrate according to the above 13, 14 or 15, which has a Young's modulus of at least 76 GPa, a specific modulus of at least 30 MNm/kg and a glass transition temperature of at least 590° C.

19. The glass for an information recording medium substrate according to any one of the above 1 to 18, which has an average linear expansion coefficient of at least $56\times10^{-7}/°$ C. in a temperature range of from $-50$ to $70°$ C.

20. The glass for an information recording medium substrate according to any one of the above 1 to 19, wherein $(T_L-T_4)<50°$ C., where $T_L$ is the liquidus temperature, and $T_4$ is the temperature at which the viscosity becomes $10^4$ dPa·s.

21. The glass for an information recording medium substrate according to any one of the above 1 to 20, which has a density of at most 2.60 g/cm$^3$.

22. A glass substrate for an information recording medium, which is made of the glass for an information recording medium substrate as defined in any one of the above 1 to 21.

23. The glass substrate for an information recording medium according to the above 22, wherein when immersed in 0.01 N nitric acid at $25°$ C., the etching rate of glass is at most 0.3 nm/h.

24. The glass substrate for an information recording medium according to the above 22 or 23, wherein when the glass is left under a steam atmosphere at $120°$ C. at 0.2 MPa for 20 hours, $C_R=C_{Li}+C_{Na}+C_K$ is at most 12 nmol/cm$^2$, where $C_{Li}$, $C_{Na}$ and $C_K$ are the amounts of Li, Na and K which precipitate on a surface of the glass, respectively.

25. A magnetic disk having a magnetic recording layer formed on the glass substrate for an information recording medium as defined in the above 22, 23 or 24.

EFFECTS OF THE INVENTION

According to the present invention, glass for an information recording medium substrate, which has a high acid resistance can be obtained, whereby surface roughening can be prevented in a polishing step or a washing step under a low pH.

Further, the polishing rate of a glass substrate for an information recording medium can be improved, whereby the efficiency of the polishing step can be improved.

Further, defects formed in the washing step can be reduced, and it is possible to obtain a high quality glass substrate for an information recording medium.

Further, without carrying out a chemical strengthening treatment, it is possible to obtain glass for an information recording medium substrate, wherein the total alkali precipitation amount after the weather resistance test is low. Therefore, a film formed on the substrate such as a base film, a magnetic film or a protective film is prevented from peeling.

Further, it is possible to prevent alkalis from diffusing to a magnetic film, and highly reliable recoding medium can be obtained.

Further, without carrying out a chemical strengthening treatment, a glass substrate for an information recording medium can be produced, whereby the number of process steps can be reduced, and the problem of stain on the substrate surface after the chemical strengthening treatment can be solved.

Further, it is possible to obtain glass for an information recording medium substrate which has a high Young's modulus and a high specific modulus. Therefore, warpage, deflection or fluttering during disk rotation can be prevented, whereby a recording medium having a high recording density can be obtained.

Further, it is possible to obtain glass for an information recording medium substrate having a low density, whereby the motor load during disk rotation can be lowered, and it is possible to accomplish reduction of the power consumption.

Further, it is possible to obtain glass for an information recording medium substrate which has a high linear expansion coefficient. Therefore, matching in thermal expansion with other drive members made of metal becomes better, the stress caused by a temperature change becomes low, and substrate fracture, etc. are prevented.

Further, it is possible to obtain glass for an information recording medium substrate which has a low liquidus temperature, as compared with the temperature at which the viscosity becomes $10^4$ dPa·s. Therefore, continuous forming is possible by e.g. a float process, a fusion method or a down draw method, whereby mass production is possible.

Further, it is possible to obtain glass for an information recording medium substrate which has a high glass transition temperature. Therefore, the temperature for heat treatment which is carried out after forming a magnetic film on the substrate can be set high, whereby it is possible to obtain an information recording medium having a high recording density.

BEST MODES FOR CARRYING OUT THE INVENTION

Figure 1:
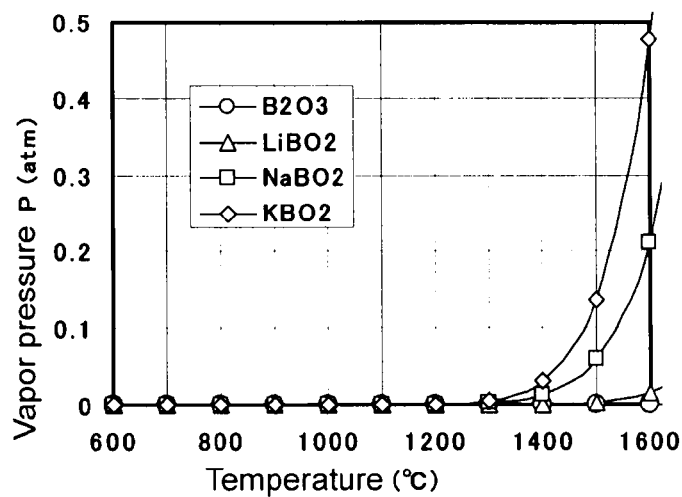
FIG. 1 shows the relationship between the temperature and the vapor pressures of $B_2O_3$ and an alkali compound of boron.

The density (d) of the glass for an information recording medium substrate of the present invention (hereinafter referred to as the glass of the present invention) is preferably at most 2.60 g/cm$^3$. If the density exceeds 2.60 g/cm$^3$, motor load during disk rotation becomes high, and power consumption becomes large. Further, disk rotation is likely to be unstable. The density is preferably at most 2.54 g/cm$^3$.

The glass of the present invention preferably has a Young's modulus (E) of at least 75 GPa and a specific modulus (E/d) of at least 28 MNm/kg. If E is lower than 75 GPa, or the specific modulus is lower than 28 MNm/kg, the glass tends to warp or deflect during disk rotation, and it may be difficult to obtain information recording medium having high recording density. E is more preferably at least 76 GPa, and E/d is more preferably at least 30 MNm/kg. E is particularly preferably at least 77 GPa, and E/d is particularly preferably at least 30 MNm/kg.

The glass transition temperature (Tg) of the glass of the present invention is preferably at least $500°$ C. If Tg is lower than $500°$ C., the temperature for the heat treatment for forming a magnetic layer cannot be made to be sufficiently high, and it may be difficult to increase the magnetic coercive force of the magnetic layer. Tg is more preferably at least $510°$ C. In the case of the glass B, Tg is typically at least $590°$ C.

In the glass of the present invention, $(T_L-T_4)$ is preferably less than $50°$ C., where $T_L$ is the liquidus temperature, and $T_4$ is the temperature at which the viscosity becomes $10^4$ dPa·s (working temperature). If $(T_L-T_4)$ is $50°$ C. or more, it may be difficult to manufacture the glass with a float process. ($T_L-T_4$) is more preferably less than 40° C., particularly preferably less than 30° C.

The glass of the present invention preferably has a linear expansion coefficient (α) of at least $56 \times 10^{-7}$/° C. in a temperature range of from −50 to 70° C. If α is lower than $56 \times 10^{-7}$/° C., the difference in the thermal expansion coefficient from other members such as a drive made of metal becomes large, and the substrate tends to fracture due to a stress caused by temperature change. α is more preferably at least $58 \times 10^{-7}$/° C. Typically, α is at most $100 \times 10^{-7}$/° C.

When the glass substrate of the present invention for an information recording medium (hereinafter, referred to as "glass substrate of the present invention") is left under steam atmosphere at 120° C. at 0.2 MPa for 20 hours, and the amount of Li, the amount of Na and the amount of K, which precipitate on a surface of the glass are represented as $C_{Li}$, $C_{Na}$ and $C_K$ respectively, $C_R = C_{Li} + C_{Na} + C_K$ is preferably at most 12 nmol/cm². If $C_R$ exceeds 12 nmol/cm², a film formed on the substrate, such as a base film, a magnetic film and a protective film is likely to be peeled. $C_R$ is more preferably at most 11 nmol/cm².

It is preferred that the glass substrate of the present invention is excellent in acid resistance such that the following nitric acid etching rate is at most 0.3 nm/h. Otherwise, in a case where a strong acid having a pH of from 1 to 2 is used in a surface polishing step or final washing step in the production process of information recording medium, particularly the production process of substrate glass for a magnetic disk, the glass surface may be roughened or peel-broken. The nitric acid etching rate is more preferably at most 0.2 nm/h.

The nitric acid etching rate: A sample to be measured is prepared by polishing a glass plate into mirror surface having a thickness of from 1 to 2 mm and a size of 4 cm×4 cm. The sample is immersed in 0.01N nitric acid at 25° C. for 3 hours, and an Si amount eluted into the nitric acid is analyzed and measured by ICP-OES.

The nitric acid etching amount is calculated from the Si amount to be obtained, the $SiO_2$ content in the glass and the density of the glass.

Next, the composition of the glass of the present invention is explained by employing mol % representation.

$SiO_2$ is a component for forming the glass structure and an essential component. If the content of $SiO_2$ is less than 61%, the acid resistance and weather resistance become low, d tends to be large, or $T_L$ increases whereby the glass becomes unstable. The content of $SiO_2$ is preferably at least 62%, more preferably at least 63%. If the content of $SiO_2$ exceeds 72%, the after-mentioned $T_2$ and $T_4$ raise, and it is difficult to melt and form glass, E or E/d decreases, or α decreases. The content of $SiO_2$ is preferably at most 71%, more preferably at most 70%.

$Al_2O_3$ has an effect to improve weather resistance and is an essential component. If the content of $Al_2O_3$ is less than 3%, the above effect is a little, E or E/d decreases, or Tg tends to be low. The content of $Al_2O_3$ is preferably at least 4%, more preferably at least 5%. If the content of $Al_2O_3$ exceeds 12%, the acid resistance deteriorates, the after-mentioned $T_2$ and $T_4$ raise, and it is difficult to melt and form glass, α decreases, or $T_L$ becomes too high. The content of $Al_2O_3$ is preferably at most 11%, more preferably at most 10%, typically at most 9%.

The difference obtained by deducting the content of $Al_2O_3$ from the content of $SiO_2$ ($SiO_2$—$Al_2O_3$) preferably exceeds 53%. If $SiO_2$—$Al_2O_3$ is at most 53%, the acid resistance may be insufficient.

Although $Li_2O$ is not an essential component, $Li_2O$ has an effect to increase E, E/d or α, or improve the melting property of glass. $Li_2O$ may be contained up to 14.3%. If the content of $Li_2O$ exceeds 14.3%, the acid resistance or weather resistance deteriorates, or Tg tends to be low. The content of $Li_2O$ is preferably at most 13%, more preferably at most 12.4%. When it is desired to increase E/d or α, for example in the glass A, the content of $Li_2O$ is preferably at most 11%, more preferably at most 10.2%, typically at most 9.5%. When it is desired to raise Tg, $Li_2O$ is not contained, or less than 5% of $Li_2O$ may preferably be contained. The content of $Li_2O$ is typically from 0 to 4.5%.

Although $Na_2O$ is not is an essential component, $Na_2O$ has an effect to increase α or improve the melting property of glass, and $Na_2O$ may be contained up to 22%. If the content of $Na_2O$ exceeds 22%, the acid resistance or weather resistance deteriorates, or Tg tends to be low. The content of $Na_2O$ is preferably at most 20%, more preferably at most 19%, typically at most 18%. When it is desired to raise Tg, the content of $Na_2O$ is preferably at most 13%, more preferably at most 12%, typically at most 11%.

Although $K_2O$ is not an essential component, $K_2O$ has an effect to increase a or improve the melting property of glass, and $K_2O$ may be contained up to 22%. If the content of $K_2O$ exceeds 22%, the acid resistance or weather resistance deteriorates, or E or E/d tends to be low. The content of $K_2O$ is preferably at most 20%, more preferably at most 19%, particularly preferably at most 13%, further preferably at most 12.8%, typically at most 12.5%. When it is desired to raise Tg, the content of $K_2O$ is preferably at most 12%, more preferably at most 10%, typically at most 9%.

When it is desired to increase E/d, the difference obtained by deducting the content of $Li_2O$ from the content of $K_2O$ ($K_2O$—$Li_2O$) is preferably at most 9%, typically at most 8.5%.

If the total content of $Li_2O$, $Na_2O$ and $K_2O$ ($R_2O$) is less than 8%, α decreases, or the melting property of glass deteriorates. $R_2O$ is preferably at least 9%, more preferably at least 10%. When it is desired to increase E/d or α, for example in the glass A, $R_2O$ is preferably at least 11%, more preferably at least 13%. If $R_2O$ exceeds 22%, the weather resistance deteriorates. $R_2O$ is preferably at most 20%, more preferably at most 19%. In the glass B, $R_2O$ is preferably at most 17%, more preferably at most 15%.

Figure 2:
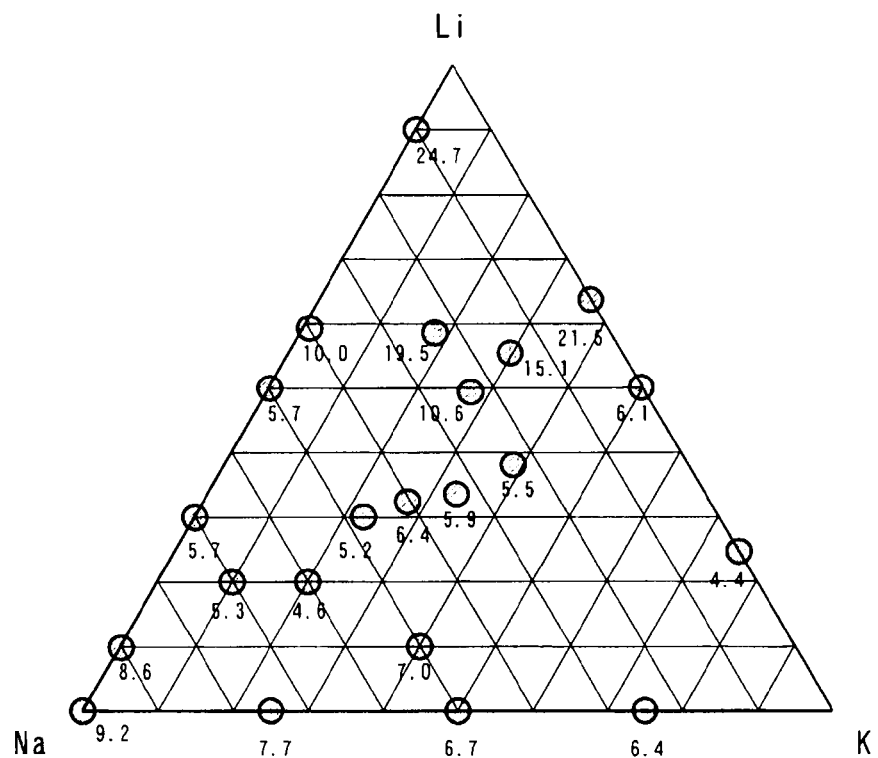
FIG. 2 shows the relationship between the ratios of alkali oxides ($Li_2O/R_2O$, $Na_2O/R_2O$ and $K_2O/R_2O$) and $C_R$. Numerical values at respective points are $C_R$ (unit: nmol/cm$^2$). At the top point of Li, $Li_2O/R_2O=1$. At the top point of Na, $Na_2O/R_2O=1$. At the top point of K, $K_2O/R_2O=1$.
Figure 3:
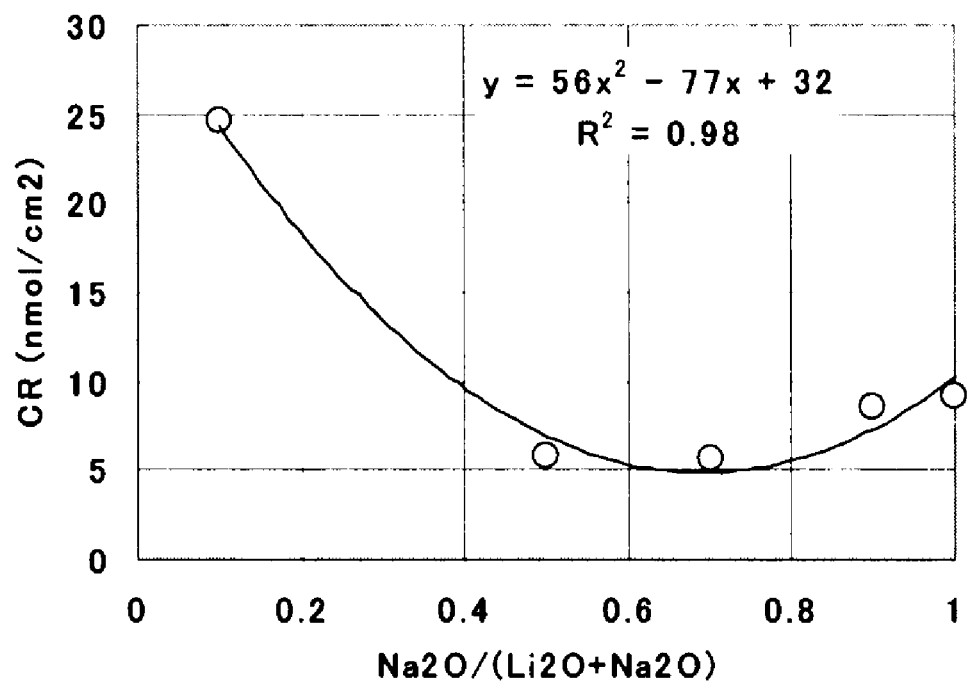
FIG. 3 shows the relationship between $Na_2O/R_2O$ and $C_R$, when $K_2O/R_2O=0$. In the figure, $y=56x^2-77x+32$ is a formula of an approximate curve (y and x are $C_R$ and $Na_2O/R_2O$, respectively, when $K_2O/R_2O=0$), and $R^2$ is a coefficient of determination.

FIG. 2 shows the relationship between the weather resistance and the ratio of alkali oxide components. It is evident from FIG. 1 that $C_R$ strongly depends on the ratio of alkali oxide components, and if $Li_2O/R_2O$ exceeds 0.52, $Na_2O/R_2O$ is less than 0.35, and $K_2O/R_2O$ is less than 0.45, the weather resistance deteriorates. $Li_2O/R_2O$ is preferably at most 0.5, or $Na_2O/R_2O$ is preferably at least 0.4.

As mentioned above, $Li_2O$ has an effect to increase E, E/d or α, and $Na_2O$ and $K_2O$ have an effect to increase α, however, the weather resistance deteriorates due to each of $Li_2O$, $Na_2O$ and $K_2O$. On the other hand, in the case of MgO, while maintaining the weather resistance, E, E/d or α can be increased. Therefore, $R_2O$ can be decreased, and the weather resistance of glass can be improved by adding MgO. As mentioned above, MgO has an effect to increase E, E/d or α or improve the melting property of glass, while maintaining weather resistance. MgO is thereby an essential component. If the content of MgO is less than 4%, the above effects are insufficient. The content of MgO is preferably at least 5%. If the content of MgO exceeds 13%, $T_L$ is too high. The content of MgO is preferably at most 12%, more preferably at most 11%. When it is desired to raise Tg, the content of MgO is preferably at most 9%.

CaO, SrO and BaO are not essential components. However, when it is desired to increase α or improve the melting property of glass while maintaining the weather resistance, CaO, SrO or BaO may be contained.

When it is desired to increase E or E/d, to decrease d or to lower $T_L$, neither CaO, SrO nor BaO is preferably contained, or at least one of CaO, SrO and BaO may be contained in the total content of at most 3%. The total content of CaO, SrO and BaO is preferably at most 2%, typically at most 1%.

For example, when it is desired that E is at least 76 GPa, E/d is at least 30 MNm/kg, and Tg is at least 590° C., the content of $Li_2O$ is preferably from 0 to less than 5%, and the content of CaO is preferably from more than 2% to 8%. If the content of $Li_2O$ is at least 5%, or the content of CaO is at most 2%, Tg is difficult to be at least 590° C. If the content of CaO exceeds 8%, E/d is difficult to be at least 30 MNm/kg. The content of $Li_2O$ is preferably from 0 to 4.5%, and the content of CaO is preferably from 2.5 to 7%, and the content of $Li_2O$ is typically from 0 to 3%, and the content of CaO is typically from 3 to 5.5%.

Although $TiO_2$ is not essential, it has an effect to increase E, E/d or Tg or improve the weather resistance. Therefore, $TiO_2$ may be contained up to 6%. If the content of $TiO_2$ exceeds 6%, $T_L$ tends to be too high, or a phase separation phenomenon tends to occur. The content of $TiO_2$ is preferably at most 5%, more preferably at most 4.5%, particularly preferably at most 4%. In a case where $TiO_2$ is contained, its content is preferably at least 0.1%.

Although $ZrO_2$ is not essential, it has an effect to improve the weather resistance, increase E or E/d, raise Tg or improve the melting property of glass. Therefore, $ZrO_2$ may be contained up to 5%. If the content of $ZrO_2$ exceeds 5%, d increases, or $T_L$ tends to be too high. The content of $ZrO_2$ is preferably at most 4%, typically at most 2.5%. When it is desired to raise Tg, the content of $ZrO_2$ is typically at least 0.5% and preferably at most 3%.

The total content of $TiO_2$ and $ZrO_2$ ($TiO_2+ZrO_2$) is preferably from 0 to 8%. If the content of $TiO_2+ZrO_2$ exceeds 8%, d increases, $T_L$ tends to be too high, or a phase separation phenomenon tends to occur. The content of $TiO_2+ZrO_2$ is more preferably at most 7%, particularly preferably at most 6%, typically at most 5.5%. In a case where $TiO_2$ or $ZrO_2$ is contained, the content of $TiO_2+ZrO_2$ is preferably at least 0.5%, more preferably at least 1%, particularly preferably at least 1.5%, typically at least 2%.

In the glass A, it is preferred that $SiO_2$ is from 62 to 71%, $Al_2O_3$ is from 4 to 12%, $Li_2O$ is from 0 to 12.4%, $Na_2O$ is from 0 to 20%, $K_2O$ is from 0 to 19%, MgO is from 5 to 12%, $TiO_2$ is from 0 to 5%, $ZrO_2$ is from 0 to 4%, and $R_2O$ is from 11 to 20%.

Further, in the glass A, it is more preferred that $SiO_2$ is from 63 to 70%, $Al_2O_3$ is from 5 to 9%, $Li_2O$ is from 0 to 10.2%, $Na_2O$ is from 0 to 19%, $K_2O$ is from 0 to 12.8%, MgO is from 5 to 11%, $TiO_2$ is from 0 to 4%, $ZrO_2$ is from 0 to 4%, and $R_2O$ is from 13 to 19%; or $SiO_2$ is from 63 to 70%, $Al_2O_3$ is from 5 to 9%, $Li_2O$ is from 0 to 11%, $Na_2O$ is from 0 to 18%, $K_2O$ is from 0 to 12.5%, MgO is from 5 to 9%, $TiO_2$ is from 0 to 4%, $ZrO_2$ is from 0 to 2.5%, and $R_2O$ is from 13 to 19%.

In the glass B, it is preferred that $Al_2O_3$ is from 3 to 11%, $Li_2O$ is from 5 to less than 5%, $Na_2O$ is from 0 to 13%, $K_2O$ is from 0 to 12%, MgO is from 4 to 11%, $R_2O$ is from 8 to 17%, and CaO is from more than 2% to 8%.

Further, in the glass B, it is more preferred that $SiO_2$ is from 61 to 71%, $Al_2O_3$ is from 4 to 11%, $Li_2O$ is from 0 to 4.5%, $Na_2O$ is from 0 to 12%, $K_2O$ is from 0 to 10%, MgO is from 4 to 9%, and CaO is from 2.5 to 7%.

The glass of the present invention basically comprises the above components, however, other components may be contained so long as the object of the present invention is not impaired. In such a case, the total content of other components is preferably at most 5%, typically at most 2%.

Further, a refining agent such as $SO_3$, Cl, $As_2O_3$, $Sb_2O_3$ or $SnO_2$ may be contained up to 2% in total.

Further, a colorant such as $Fe_2O_3$, $CO_3O_4$ or NiO may be contained up to 2% in total.

Further, if $B_2O_3$ coexists with an alkali metal component, it is likely to volatilize. Therefore, it is preferred not to contain $B_2O_3$. Even if $B_2O_3$ is contained, its content is less than 1%, preferably less than 0.5%.

Further, in a case where ZnO is contained, the total content represented by mass percentage of MgO and ZnO is preferably at most 7%, more preferably at most 6%, further preferably at most 5%, particularly preferably at most 4%.

Whether $B_2O_3$ or ZnO is contained or not, the ratio obtained by dividing the total content of MgO and ZnO represented by mass percentage by the ratio obtained by dividing the total content of $SiO_2$, $Al_2O_3$ and $B_2O_3$ represented by mass percentage ($(MgO+ZnO)/(SiO_2+Al_2O_3+B_2O_3)$) is preferably at most 0.08.

The glass substrate of the present invention is usually a circular glass plate.

The glass substrate of the present invention is typically used as a glass substrate for a magnetic disk.

The glass substrate for an magnetic disk is widely used for a 2.5 inch substrate (outside diameter of a glass substrate: 65 mm) used for laptop computers, etc. or a 1.8 inch substrate (outside diameter of a glass substrate: 48 mm) used for portable MP3 players, etc., and its market is expanding year by year, while it is demanded to supply the glass substrate at low price.

Mass production of plate glass is widely carried out by a continuous forming method such as a float process, a fusion method or a down draw method. Since the glass of the present invention is glass which can be formed by a float process as mentioned above, the glass of the present invention is preferred for mass production.

The methods for producing the glass of the present invention and the glass substrate of the present invention are not particularly restricted, and various methods can be applied. For example, materials of respective components to be usually used are measured and mixed so as to constitute the desired composition and then heat-melted in a glass melting furnace. The glass is homogenized by bubbling, stirring, adding a refining agent or the like, then formed by a conventional method such as a float process, a press method, a fusion method or a down draw method and annealed. Then, as a case requires, processing such as grinding or polishing is carried out to form a glass substrate having a predetermined size and shape. The forming method is particularly preferably a float process, which is suitable for mass production. Further, a continuous forming method other than a float process, namely a fusion method or a down draw method is also preferred.

EXAMPLES

Materials of respective components were measured and mixed so as to constitute the compositions represented by mol % in the rows for from $SiO_2$ to $ZrO_2$ or $B_2O_3$ in Tables 1 to 18 and melted in a platinum crucible at a temperature of from 1,550 to 1,600° C. for 3 to 5 hours. At the time of melting, a platinum stirrer was inserted in molten glass, and the molten glass was stirred for 2 hours to homogenize glass. Then, the molten glass was flown out, formed into a plate and annealed to room temperature at a cooling rate of 1° C./minute. Further, in Tables, $R_2O$ represents the total content (unit: mol %) of $Li_2O$, $Na_2O$ and $K_2O$.

Glasses of Examples 1 to 117, 126 to 132, 137 and 138 are working examples of the present invention, and glasses of Examples 118 to 125 and 133 to 136 are comparative examples. Further, glass of Example 126 to 136 were produced by without carrying out the above mentioned melting. Further, glass of Example 123 is the same as the above-mentioned commercially available chemical strengthened glass, and it was produced by chemical strengthening of the glass of Example 124.

With respect to the glass plates thus obtained, density d (unit: g/cm³), the above-mentioned average linear expansion coefficient α (unit×$10^{-7}$/° C.), Young's modulus E (unit: GPa), specific modulus E/d (unit: MNm/kg), glass transition temperature Tg (unit: ° C.), liquidus temperature $T_L$ (unit: ° C.), temperature at which the viscosity becomes $10^2$ dPa·s $T_2$ (unit: ° C.), temperature at which the viscosity becomes $10^4$ dPa·s $T_4$ (unit: ° C.), the above-mentioned $C_R$ (unit: nmol/cm²), and the above-mentioned nitric acid etching rate were measured by the following methods. The results are shown in Tables 1 to 18, and "–" in Tables means "not measured", and a value with "*" are an estimated value from its composition.

Further, compositions of respective glasses represented by mass percentage are shown in Tables 19 to 36.

d: d was measured by Archimedes' method by using 20 to 50 g of glass having no bubble.

α: By using a differential thermal dilatometer and quartz glass as a reference material, the degree of elongation of glass at a time of raising the temperature from room temperature at a rate of 5° C./minute was measured until the temperature at which glass softened, and elongation was no longer observed, namely the yield point, and an average linear expansion coefficient in a temperature range of from −50 to 70° C. was calculated from the obtained thermal expansion curve.

E: With respect to a glass plate having a thickness of from 5 to 10 mm and a size of 3 cm×3 cm, E was measured by an ultrasonic pulse-echo method.

Tg: By using a differential thermal dilatometer and quartz glass as a reference material, the degree of elongation of glass at a time of raising the temperature from room temperature at a rate of 5° C./minute was measured until the yield point, and a temperature at a critical point on the obtained thermal expansion curve was determined as a glass transition temperature.

$T_L$: Glass was pulverized by a mortar to glass particles having a particle size of about 2 mm, the glass particles were lined up on a platinum board and heat-treated in a temperature gradient furnace for 24 hours. The highest temperature of the glass particles wherein crystal precipitated was determined as a liquidus temperature. Further, for example, "≧1150° C." and "≦1050° C." mean "at least 1,150° C." and "at most 1,050° C." respectively.

$T_2$ and $T_4$: $T_2$ and $T_4$ were measured by a rotation viscometer.

$C_R$: Both surfaces of a glass plate having a thickness of from 1 to 2 mm and a size of 4 cm×4 cm were mirror-polished with cerium oxide and washed with calcium carbonate and a detergent, and then the glass plate was put in a highly accelerated stress test system (unsaturated type pressure cracker EHS-411M, manufactured by ESPEC Corp.) and left under a steam atmosphere at 120° C. and 0.2 MPa for 20 hours. The tested sample and 20 ml of ultra pure water were put in a washed plastic bag provided with a zipper, a surface precipitate was dissolved with applying ultrasonic wave for 10 minutes, and respective alkali components of eluates were quantified by using ICP-MS. The amount of such eluates was converted to mol and normalized with the surface area of the test sample.

Nitric acid etching rate: The nitric acid etching rate was observed by the above-mentioned method (unit: nm/h). The results are shown in the row for "Acid resistance".

The acid resistance is strongly influenced by $Al_2O_3$, and the lower the amount of $Al_2O_3$ is, the more the acid resistance improves. On the other hand, the weather resistance is also strongly influenced by $Al_2O_3$, and the lower the amount of $Al_2O_3$ is, the more the weather resistance deteriorates. Further, the weather resistance is also strongly influenced by alkali components, and when the total amount of alkali components is reduced, or the ratio of alkali components is adjusted within a preferred range, the weather resistance improves. The total amount of alkali components in the glass of the present invention is reduced, compared to Example 122, and the ratio of alkali components is adjusted within an appropriate range, whereby the deterioration of the weather resistance due to the reduction of $Al_2O_3$ is suppressed, and the acid resistance of the glass of the present invention is superior to that of Example 122.

TABLE 1

| Ex. | 1 | 2 | 3 | 4 | 5 | 6 | 7 | 8 |
|---|---|---|---|---|---|---|---|---|
| $SiO_2$ | 66.0 | 66.0 | 66.0 | 66.0 | 65.0 | 64.0 | 66.0 | 66.0 |
| $Al_2O_3$ | 5.5 | 5.5 | 5.5 | 5.5 | 6.5 | 7.5 | 5.5 | 5.5 |
| $Li_2O$ | 8.4 | 8.4 | 8.4 | 8.4 | 8.4 | 8.4 | 5.5 | 6.5 |
| $Na_2O$ | 4.0 | 4.0 | 4.0 | 4.0 | 5.0 | 5.0 | 6.9 | 4.0 |
| $K_2O$ | 4.6 | 4.6 | 4.6 | 4.6 | 4.6 | 4.6 | 4.6 | 6.5 |
| MgO | 8.0 | 8.0 | 8.0 | 8.0 | 8.0 | 8.0 | 8.0 | 8.0 |
| $TiO_2$ | 2.0 | 0 | 3.5 | 1.0 | 0 | 0 | 1.0 | 1.0 |
| $ZrO_2$ | 1.5 | 3.5 | 0 | 2.5 | 2.5 | 2.5 | 2.5 | 2.5 |
| $R_2O$ | 17.0 | 17.0 | 17.0 | 17.0 | 18.0 | 18.0 | 17.0 | 17.0 |
| $Li_2O/R_2O$ | 0.49 | 0.49 | 0.49 | 0.49 | 0.47 | 0.47 | 0.32 | 0.38 |
| $Na_2O/R_2O$ | 0.24 | 0.24 | 0.24 | 0.24 | 0.28 | 0.28 | 0.41 | 0.24 |
| $K_2O/R_2O$ | 0.27 | 0.27 | 0.27 | 0.27 | 0.26 | 0.26 | 0.27 | 0.38 |
| d | 2.50 | 2.53 | 2.47 | 2.51 | 2.51 | 2.52 | 2.52 | 2.51 |
| α | 69 | 69 | 73 | 69 | 73 | 72 | 75 | 73 |
| E | 83.5 | 85.7 | 83.6 | 84.2 | 83.3 | 83.8 | 81.7 | 82.2 |
| Tg | 534 | 545 | 523 | 540 | 532 | 540 | 543 | 546 |
| $T_L$ | 1000 | ≧1150 | 1000 | 1100 |  |  |  | ≦1050 |
| E/d | 33.4 | 33.9 | 33.8 | 33.5 | 33.2 | 33.3 | 32.4 | 32.7 |
| $T_2$ | 1493* | 1501* | 1488* | 1497* | 1494* | 1501* | 1529* | 1538* |
| $T_4$ | 1058* | 1081* | 1041* | 1070* | 1069* | 1078* | 1099* | 1106* |
| $C_R$ | 8.5 | 6.4 | 10.4 | 10.6 | 7.3 | 5.2 | 6.4 | 5.4 |

TABLE 1-continued

| Ex. | 1 | 2 | 3 | 4 | 5 | 6 | 7 | 8 |
|---|---|---|---|---|---|---|---|---|
| Acid resistance | 0.07 | 0.07 | 0.07 | 0.10 | 0.11 | 0.11 | 0.07* | 0.09 |

TABLE 2

| Ex. | 9 | 10 | 11 | 12 | 13 | 14 | 15 | 16 |
|---|---|---|---|---|---|---|---|---|
| $SiO_2$ | 66.0 | 68.0 | 66.0 | 66.0 | 66.0 | 66.0 | 66.0 | 66.0 |
| $Al_2O_3$ | 5.5 | 5.5 | 5.5 | 5.5 | 5.5 | 5.5 | 5.5 | 5.5 |
| $Li_2O$ | 5.1 | 7.4 | 5.7 | 8.5 | 8.5 | 5.1 | 3.4 | 3.4 |
| $Na_2O$ | 8.0 | 3.5 | 5.7 | 0 | 8.5 | 11.9 | 11.9 | 10.2 |
| $K_2O$ | 3.9 | 4.1 | 5.7 | 8.5 | 0 | 0 | 1.7 | 3.4 |
| MgO | 8.0 | 8.0 | 8.0 | 8.0 | 8.0 | 8.0 | 8.0 | 8.0 |
| $TiO_2$ | 1.0 | 1.0 | 1.0 | 1.0 | 1.0 | 1.0 | 1.0 | 1.0 |
| $ZrO_2$ | 2.5 | 2.5 | 2.5 | 2.5 | 2.5 | 2.5 | 2.5 | 2.5 |
| $R_2O$ | 17.0 | 15.0 | 17.0 | 17.0 | 17.0 | 17.0 | 17.0 | 17.0 |
| $Li_2O/R_2O$ | 0.30 | 0.49 | 0.33 | 0.50 | 0.50 | 0.30 | 0.20 | 0.20 |
| $Na_2O/R_2O$ | 0.47 | 0.24 | 0.33 | 0 | 0.50 | 0.70 | 0.70 | 0.60 |
| $K_2O/R_2O$ | 0.23 | 0.27 | 0.33 | 0.50 | 0.00 | 0.00 | 0.10 | 0.20 |
| d | 2.52 | 2.50 | 2.52 | 2.50 | 2.53 | 2.53 | 2.53 | 2.53 |
| α | 74 | 65 | 75 | 73 | 68 | 71 | 77 | 78 |
| E | 81.9 | 84.3 | 81.2 | 78.9 | 86.7 | 83.2 | 81.4 | 80.4 |
| Tg | 547 | 562 | 545 | 561 | 541 | 554 | 556 | 554 |
| $T_L$ | ≦1050 | 1150 | ≦1050 | 1050 | ≧1100 | 1050 | 1050 | ≦1050 |
| E/d | 32.4 | 33.7 | 32.2 | 31.6 | 34.3 | 32.9 | 32.1 | 31.8 |
| $T_2$ | 1526* | 1559* | 1538* | 1537* | 1448* | 1485* | 1521* | 1539* |
| $T_4$ | 1097* | 1117* | 1107* | 1104* | 1028* | 1062* | 1095* | 1110* |
| $C_R$ | 5.2 | 6.1 | 5.9 | 6.1 | 5.7 | 5.7 | 5.3 | 4.6 |
| Acid resistance | 0.07* | 0.06 | 0.08 | 0.07* | 0.06 | 0.07* | 0.07* | 0.07* |

TABLE 3

| Ex. | 17 | 18 | 19 | 20 | 21 | 22 | 23 | 24 |
|---|---|---|---|---|---|---|---|---|
| $SiO_2$ | 66.0 | 64.0 | 64.0 | 63.0 | 63.0 | 63.0 | 63.0 | 63.0 |
| $Al_2O_3$ | 5.5 | 5.5 | 7.5 | 7.5 | 7.5 | 8.5 | 7.5 | 7.5 |
| $Li_2O$ | 1.7 | 9.4 | 8.0 | 6.5 | 5.9 | 8.4 | 7.8 | 5.9 |
| $Na_2O$ | 15.3 | 4.5 | 10.9 | 11.3 | 11.3 | 10.0 | 10.0 | 11.3 |
| $K_2O$ | 0 | 5.1 | 0 | 0 | 0 | 0.6 | 0.7 | 0 |
| MgO | 8.0 | 8.0 | 7.0 | 9.2 | 10.2 | 6.0 | 7.6 | 10.2 |
| $TiO_2$ | 1.0 | 1.0 | 0 | 0 | 0 | 2.5 | 2.0 | 0.5 |
| $ZrO_2$ | 2.5 | 2.5 | 2.5 | 2.5 | 2.0 | 1.0 | 1.5 | 1.5 |
| $R_2O$ | 17.0 | 19.0 | 19.0 | 17.8 | 17.3 | 19.0 | 18.4 | 17.3 |
| $Li_2O/R_2O$ | 0.10 | 0.49 | 0.42 | 0.37 | 0.34 | 0.44 | 0.42 | 0.34 |
| $Na_2O/R_2O$ | 0.90 | 0.24 | 0.58 | 0.63 | 0.66 | 0.53 | 0.54 | 0.66 |
| $K_2O/R_2O$ | 0 | 0.27 | 0 | 0 | 0 | 0.03 | 0.04 | 0 |
| d | 2.53 | 2.53 | 2.52 | 2.54 | 2.53 | 2.51 | 2.52 | 2.52 |
| α | 78 | 75 | 72 | 72 | 72 | 74 | 72 | 72 |
| E | 79.0 | 84.2 | 85.8 | 85.8 | 84.7 | 85.1 | 85.6 | 84.5 |
| Tg | 583 | 520 | 534 | 553 | 556 | 531 | 534 | 554 |
| $T_L$ | <1000 | 1050 | 1100 |  | 1100 |  | <1000 | 1100 |
| E/d | 31.2 | 33.3 | 34.0 | 33.8 | 33.5 | 33.9 | 33.9 | 33.6 |
| $T_2$ | 1522* | 1435* | 1452* | 1451* | 1456* | 1463* | 1444* | 1454* |
| $T_4$ | 1097* | 1023* | 1032* | 1046* | 1050* | 1028* | 1024* | 1044* |
| $C_R$ | 8.5 | 7.9 | 5.7 | 4.5 | 4.4 | 7.0 | 8.1 | 6.2 |
| Acid resistance | 0.07 | 0.06 | 0.06 | 0.12 | 0.12 | 0.16 | 0.14 | 0.11 |

TABLE 4

| Ex. | 25 | 26 | 27 | 28 | 29 | 30 | 31 | 32 |
|---|---|---|---|---|---|---|---|---|
| $SiO_2$ | 63.0 | 63.0 | 63.0 | 63.0 | 63.0 | 70.0 | 66.0 | 66.0 |
| $Al_2O_3$ | 7.5 | 7.5 | 7.5 | 7.5 | 7.5 | 5.5 | 5.5 | 5.5 |
| $Li_2O$ | 5.9 | 5.9 | 5.9 | 5.9 | 5.9 | 6.4 | 1.7 | 0 |
| $Na_2O$ | 11.3 | 11.3 | 11.3 | 11.3 | 11.3 | 3.1 | 8.5 | 17.0 |
| $K_2O$ | 0 | 0 | 0 | 0 | 0 | 3.5 | 6.8 | 0 |
| MgO | 10.2 | 10.2 | 8.7 | 7.7 | 6.7 | 8.0 | 8.0 | 8.0 |
| $TiO_2$ | 1.0 | 1.5 | 2.0 | 3.0 | 4.0 | 1.0 | 1.0 | 1.0 |
| $ZrO_2$ | 1.0 | 0.5 | 1.5 | 1.5 | 1.5 | 2.5 | 2.5 | 2.5 |

TABLE 4-continued

| Ex. | 25 | 26 | 27 | 28 | 29 | 30 | 31 | 32 |
|---|---|---|---|---|---|---|---|---|
| $R_2O$ | 17.3 | 17.3 | 17.3 | 17.3 | 17.3 | 13.0 | 17.0 | 17.0 |
| $Li_2O/R_2O$ | 0.34 | 0.34 | 0.34 | 0.34 | 0.34 | 0.49 | 0.10 | 0 |
| $Na_2O/R_2O$ | 0.66 | 0.66 | 0.66 | 0.66 | 0.66 | 0.24 | 0.50 | 1.00 |
| $K_2O/R_2O$ | 0 | 0 | 0 | 0 | 0 | 0.27 | 0.40 | 0 |
| d | 2.51 | 2.50 | 2.53 | 2.54 | 2.54 | 2.49 | 2.52 | 2.54* |
| α | 73 | 72 | 72 | 71 | 71 | 58 | 82 | 80* |
| E | 84.5 | 84.3 | 84.8 | 85.2 | 85.2 | 84.7 | 76.8 | 80.0* |
| Tg | 549 | 545 | 556 | 557 | 559 | 585 | 574 | 566* |
| $T_L$ | 1100 | | 1080 | 1040 | 1000 | ≧1200 | ≦1100 | |
| E/d | 33.7 | 33.7 | 33.5 | 33.6 | 33.5 | 34.1 | 30.4 | 31.5* |
| $T_2$ | 1452* | 1450* | 1474 | 1474 | 1479 | 1620* | 1593* | 1540* |
| $T_4$ | 1038* | 1033* | 1044 | 1047 | 1042 | 1163* | 1158* | 1114* |
| $C_R$ | 7.0 | 8.9 | 5.1 | 4.9 | 4.5 | 4.5 | 6.9 | 9.2 |
| Acid resistance | 0.13 | 0.12 | 0.13 | 0.12 | 0.12 | 0.18 | 0.06 | 0.07* |

TABLE 5

| Ex. | 33 | 34 | 35 | 36 | 37 | 38 | 39 | 40 |
|---|---|---|---|---|---|---|---|---|
| $SiO_2$ | 66.0 | 66.0 | 66.0 | 66.0 | 65.8 | 66.0 | 64.0 | 64.0 |
| $Al_2O_3$ | 5.5 | 5.5 | 5.5 | 5.5 | 11.0 | 10.0 | 11.0 | 10.0 |
| $Li_2O$ | 0 | 0 | 0 | 4.3 | 3.0 | 0 | 4.8 | 4.8 |
| $Na_2O$ | 8.5 | 12.8 | 4.3 | 0 | 13.5 | 14.0 | 12.0 | 12.0 |
| $K_2O$ | 8.5 | 4.3 | 12.8 | 12.8 | 0 | 0 | 0 | 0 |
| MgO | 8.0 | 8.0 | 8.0 | 8.0 | 6.7 | 10.0 | 8.2 | 9.2 |
| $TiO_2$ | 1.0 | 1.0 | 1.0 | 1.0 | 0 | 0 | 0 | 0 |
| $ZrO_2$ | 2.5 | 2.5 | 2.5 | 2.5 | 0 | 0 | 0 | 0 |
| $R_2O$ | 17.0 | 17.0 | 17.0 | 17.0 | 16.5 | 14.0 | 16.8 | 16.8 |
| $Li_2O/R_2O$ | 0 | 0 | 0 | 0.25 | 0.18 | 0.00 | 0.29 | 0.29 |
| $Na_2O/R_2O$ | 0.50 | 0.75 | 0.25 | 0 | 0.82 | 1.00 | 0.71 | 0.71 |
| $K_2O/R_2O$ | 0.50 | 0.25 | 0.75 | 0.75 | 0 | 0 | 0 | 0 |
| d | 2.53* | 2.54* | 2.52* | 2.51* | 2.45 | 2.45 | 2.46 | 2.46 |
| α | 85* | 83* | 88* | 81* | 74 | 71 | 72 | 72 |
| E | 75.1* | 77.6* | 72.7* | 75.9* | 79.9 | 76.9 | 81.3 | 81.9 |
| Tg | 563* | 564* | 561* | 551* | 570* | 596* | 564* | 557* |
| $T_L$ | | | | | ≦1150 | | 1200 | ≧1150 |
| E/d | 29.7* | 30.6* | 28.8* | 30.3* | 32.6 | 31.4 | 33.1 | 33.2 |
| $T_2$ | 1629* | 1585* | 1674* | 1628* | 1645* | 1665* | 1583* | 1552* |
| $T_4$ | 1191* | 1153* | 1229* | 1185* | 1169* | 1202* | 1126* | 1105* |
| $C_R$ | 6.7 | 7.7 | 6.4 | 4.4 | 2.0 | 3.9 | 2.5 | 3.1 |
| Acid resistance | 0.07* | 0.07* | 0.07* | 0.07* | 0.17 | 0.12 | 0.22 | 0.18 |

TABLE 6

| Ex. | 41 | 42 | 43 | 44 | 45 | 46 | 47 | 48 |
|---|---|---|---|---|---|---|---|---|
| $SiO_2$ | 64.0 | 64.5 | 64.0 | 64.0 | 63.7 | 63.4 | 64.0 | 64.0 |
| $Al_2O_3$ | 9.5 | 9.5 | 9.5 | 9.1 | 9.1 | 9.4 | 10.0 | 8.0 |
| $Li_2O$ | 4.8 | 3.8 | 4.0 | 5.2 | 5.5 | 5.5 | 5.8 | 5.8 |
| $Na_2O$ | 11.5 | 12.0 | 12.3 | 11.5 | 11.5 | 11.5 | 11.5 | 11.5 |
| $K_2O$ | 0 | 0 | 0 | 0 | 0 | 0 | 0 | 0 |
| MgO | 10.2 | 10.2 | 10.2 | 10.2 | 10.2 | 10.2 | 7.2 | 9.2 |
| $TiO_2$ | 0 | 0 | 0 | 0 | 0 | 0 | 0 | 0 |
| $ZrO_2$ | 0 | 0 | 0 | 0 | 0 | 0 | 1.5 | 1.5 |
| $R_2O$ | 16.3 | 15.8 | 16.3 | 16.7 | 17.0 | 17.0 | 17.3 | 17.3 |
| $Li_2O/R_2O$ | 0.29 | 0.24 | 0.25 | 0.31 | 0.32 | 0.32 | 0.34 | 0.34 |
| $Na_2O/R_2O$ | 0.71 | 0.76 | 0.75 | 0.69 | 0.68 | 0.68 | 0.66 | 0.66 |
| $K_2O/R_2O$ | 0 | 0 | 0 | 0 | 0 | 0 | 0 | 0 |
| d | 2.47 | 2.46 | 2.47 | 2.47 | 2.47 | 2.47 | 2.50 | 2.50 |
| α | 69 | 69 | 72 | 71 | 71 | 71 | 71 | 70 |
| E | 83.0 | 81.1 | 81.2 | 81.9 | 82.3 | 83.3 | 83.5 | 83.7 |
| Tg | 559* | 566* | 560* | 551* | 547* | 549* | 566* | 553* |
| $T_L$ | | | | | ≧1150 | ≦1100 | 1050 | |
| E/d | 33.6 | 32.9 | 32.9 | 33.2 | 33.4 | 33.8 | 33.4 | 33.4 |
| $T_2$ | 1539* | 1564* | 1547* | 1520* | 1508* | 1511* | 1553* | 1491* |
| $T_4$ | 1098* | 1119* | 1107* | 1082* | 1073* | 1076* | 1110* | 1067* |
| $C_R$ | 5.0 | 7.8* | 8.4* | 5.7 | 6.6 | 5.3 | 3.9 | 6.0 |
| Acid resistance | 0.14 | 0.16* | 0.17* | 0.20 | 0.11 | 0.17 | 0.18 | 0.10 |

TABLE 7

| Ex. | 49 | 50 | 51 | 52 | 53 | 54 | 55 | 56 |
|---|---|---|---|---|---|---|---|---|
| $SiO_2$ | 64.0 | 64.0 | 64.0 | 64.0 | 64.0 | 64.0 | 64.0 | 64.0 |
| $Al_2O_3$ | 9.0 | 9.0 | 9.0 | 9.0 | 9.0 | 9.0 | 9.0 | 9.0 |
| $Li_2O$ | 2.5 | 3.0 | 3.5 | 3.0 | 3.0 | 3.0 | 3.0 | 3.0 |
| $Na_2O$ | 4.5 | 4.5 | 4.5 | 3.5 | 1.0 | 4.0 | 4.5 | 2.5 |
| $K_2O$ | 5.0 | 5.5 | 6.0 | 5.0 | 8.0 | 4.0 | 4.5 | 6.0 |
| MgO | 6.5 | 6.5 | 6.5 | 6.5 | 6.5 | 7.0 | 7.0 | 6.8 |
| CaO | 5.5 | 4.5 | 3.5 | 5.5 | 5.0 | 5.5 | 3.0 | 5.3 |
| $TiO_2$ | 1.5 | 1.5 | 1.5 | 2.0 | 2.0 | 2.0 | 3.0 | 2.0 |
| $ZrO_2$ | 1.5 | 1.5 | 1.5 | 1.5 | 1.5 | 1.5 | 2.0 | 1.5 |
| $R_2O$ | 12.0 | 13.0 | 14.0 | 11.5 | 12.0 | 11.0 | 12.0 | 11.5 |
| $Li_2O/R_2O$ | 0.21 | 0.23 | 0.25 | 0.26 | 0.25 | 0.27 | 0.25 | 0.26 |
| $Na_2O/R_2O$ | 0.38 | 0.35 | 0.32 | 0.30 | 0.08 | 0.36 | 0.38 | 0.22 |
| $K_2O/R_2O$ | 0.42 | 0.42 | 0.43 | 0.43 | 0.67 | 0.36 | 0.38 | 0.52 |
| d | 2.54 | 2.53 | 2.52 | 2.54 | 2.53 | 2.54 | 2.55 | 2.54 |
| α | 68 | 70 | 71 | 67 | 70 | 64 | 67 | 68 |
| E | 81.8 | 81.8 | 81.1 | 82.6 | 80.4 | 83.9 | 83.0 | 82.0 |
| Tg | 625 | 603 | 593 | 631 | 640 | 632 | 633 | 636 |
| $T_L$ | 1140 | | | | | | | |
| E/d | 32.2 | 32.3 | 32.1 | 32.5 | 31.8 | 33.0 | 32.6 | 32.3 |
| $T_2$ | 1621* | 1621* | 1620* | 1621* | 1653* | 1613* | 1636* | 1638* |
| $T_4$ | 1191* | 1186* | 1182* | 1191* | 1216* | 1187* | 1203* | 1201* |
| $C_R$ | 0.9* | 1.1* | 1.4* | 0.7* | 0.7* | 0.7* | 0.5* | 0.7* |
| Acid resistance | 0.16* | 0.16* | 0.16* | 0.16* | 0.25 | 0.16* | 0.17 | 0.12 |

TABLE 8

| Ex. | 57 | 58 | 59 | 60 | 61 | 62 | 63 | 64 |
|---|---|---|---|---|---|---|---|---|
| $SiO_2$ | 64.0 | 63.0 | 62.0 | 62.0 | 64.0 | 64.0 | 64.0 | 64.0 |
| $Al_2O_3$ | 9.0 | 9.0 | 9.5 | 9.0 | 7.0 | 9.0 | 9.0 | 9.0 |
| $Li_2O$ | 3.5 | 4.0 | 4.0 | 3.5 | 3.5 | 3.5 | 3.5 | 1.5 |
| $Na_2O$ | 2.5 | 2.5 | 2.5 | 2.5 | 2.5 | 2.5 | 2.5 | 2.5 |
| $K_2O$ | 6.0 | 6.0 | 6.5 | 6.0 | 6.0 | 6.0 | 6.0 | 6.0 |
| MgO | 7.0 | 7.5 | 7.5 | 7.0 | 7.0 | 5.0 | 7.0 | 7.0 |
| CaO | 3.0 | 3.0 | 3.0 | 3.0 | 3.0 | 3.0 | 3.0 | 3.0 |
| $TiO_2$ | 3.0 | 3.0 | 3.0 | 5.0 | 5.0 | 5.0 | 5.0 | 5.0 |
| $ZrO_2$ | 2.0 | 2.0 | 2.0 | 2.0 | 2.0 | 2.0 | 0 | 2.0 |
| $R_2O$ | 12.0 | 12.5 | 13.0 | 12.0 | 12.0 | 12.0 | 12.0 | 10.0 |
| $Li_2O/R_2O$ | 0.29 | 0.32 | 0.31 | 0.29 | 0.29 | 0.29 | 0.29 | 0.15 |
| $Na_2O/R_2O$ | 0.21 | 0.20 | 0.19 | 0.21 | 0.21 | 0.21 | 0.21 | 0.25 |
| $K_2O/R_2O$ | 0.50 | 0.48 | 0.50 | 0.50 | 0.50 | 0.50 | 0.50 | 0.60 |
| d | 2.54 | 2.55 | 2.55 | 2.57 | 2.55 | 2.55 | 2.51 | 2.55 |
| α | 67 | 68 | 69 | 75 | 68 | 70 | 69 | 65 |
| E | 82.6 | 83.4 | 82.8 | 83.3 | 82.2 | 81.7 | 80.5 | 80.4 |
| Tg | 635 | 623 | 626 | 635 | 618 | 629 | 619 | 687 |
| $T_L$ | ≧1250 | | | | | | | 1200 |
| E/d | 32.5 | 32.7 | 32.4 | 32.4 | 32.2 | 32.0 | 32.1 | 31.5 |
| $T_2$ | 1646* | 1615* | 1610* | 1612* | 1597* | 1658* | 1639* | 1691* |
| $T_4$ | 1211* | 1190* | 1189* | 1191* | 1172* | 1215* | 1188* | 1253* |
| $C_R$ | 0.5* | 0.5* | 0.4* | 0.3* | 0.6* | 0.3* | 1.0* | 0.2* |
| Acid resistance | 0.16* | 0.18* | 0.22* | 0.21* | 0.12* | 0.16* | 0.16* | 0.16* |

TABLE 9

| Ex. | 65 | 66 | 67 | 68 | 69 | 70 | 71 | 72 |
|---|---|---|---|---|---|---|---|---|
| $SiO_2$ | 64.0 | 64.0 | 66.0 | 66.0 | 66.0 | 66.0 | 66.0 | 66.0 |
| $Al_2O_3$ | 9.0 | 9.0 | 7.0 | 7.0 | 7.9 | 8.0 | 7.6 | 7.5 |
| $Li_2O$ | 3.5 | 3.5 | 3.5 | 3.5 | 3.0 | 3.0 | 3.4 | 3.0 |
| $Na_2O$ | 0.5 | 2.5 | 2.5 | 2.5 | 3.5 | 3.5 | 2.4 | 3.5 |
| $K_2O$ | 6.0 | 4.0 | 6.0 | 6.0 | 5.1 | 5.1 | 5.7 | 5.8 |
| MgO | 7.0 | 7.0 | 7.0 | 6.0 | 6.0 | 6.0 | 6.0 | 6.5 |
| CaO | 3.0 | 3.0 | 3.0 | 3.0 | 3.0 | 3.0 | 3.0 | 3.5 |
| $TiO_2$ | 5.0 | 5.0 | 3.0 | 4.5 | 3.8 | 3.9 | 4.5 | 2.0 |
| $ZrO_2$ | 2.0 | 2.0 | 2.0 | 1.5 | 1.8 | 1.5 | 1.5 | 2.2 |
| $R_2O$ | 10.0 | 10.0 | 12.0 | 12.0 | 11.5 | 11.6 | 11.4 | 12.3 |
| $Li_2O/R_2O$ | 0.35 | 0.35 | 0.29 | 0.29 | 0.26 | 0.26 | 0.30 | 0.24 |
| $Na_2O/R_2O$ | 0.05 | 0.25 | 0.21 | 0.21 | 0.30 | 0.30 | 0.21 | 0.28 |
| $K_2O/R_2O$ | 0.60 | 0.40 | 0.50 | 0.50 | 0.44 | 0.44 | 0.50 | 0.47 |
| d | 2.55 | 2.56 | 2.53 | 2.53 | 2.53 | 2.53 | 2.53 | 2.54 |
| α | 63 | 60 | 64 | 66 | 65 | 64 | 64 | 69 |

TABLE 9-continued

| Ex. | 65 | 66 | 67 | 68 | 69 | 70 | 71 | 72 |
|---|---|---|---|---|---|---|---|---|
| E | 82.2 | 84.5 | 82.3 | 80.8 | 81.4 | 81.6 | 81.5 | 81.7 |
| Tg | 660 | 652 | 619 | 595 | 612 | 613 | 620 | 612 |
| $T_L$ |  |  | 1190 | 1080 | 1150 | 1200 | 1100 | 1204 |
| E/d | 32.3 | 33.1 | 32.5 | 32.0 | 32.2 | 32.3 | 32.2 | 32.2 |
| $T_2$ | 1669* | 1648* | 1631* | 1635* | 1661* | 1659* | 1655* | 1641* |
| $T_4$ | 1233* | 1215* | 1192* | 1188* | 1211* | 1208* | 1205* | 1202* |
| $C_R$ | 0.2* | 0.2* | 1.1* | 1.1* | 0.7* | 0.8* | 0.8* | 1.1* |
| Acid resistance | 0.16* | 0.16* | 0.09* | 0.09* | 0.10* | 0.10* | 0.09* | 0.09* |

TABLE 10

| Ex. | 73 | 74 | 75 | 76 | 77 | 78 | 79 | 80 |
|---|---|---|---|---|---|---|---|---|
| $SiO_2$ | 66.0 | 67.6 | 67.9 | 67.5 | 68.1 | 66.0 | 66.0 | 66.0 |
| $Al_2O_3$ | 7.5 | 7.5 | 7.5 | 7.5 | 7.5 | 7.5 | 7.5 | 7.5 |
| $Li_2O$ | 2.5 | 0.3 | 1.8 | 0 | 0.1 | 0 | 0.2 | 2.0 |
| $Na_2O$ | 4.0 | 7.6 | 3.1 | 10.0 | 9.4 | 10.0 | 10.0 | 7.0 |
| $K_2O$ | 5.8 | 3.2 | 6.0 | 1.7 | 2.2 | 3.9 | 3.2 | 4.4 |
| MgO | 6.5 | 6.5 | 6.5 | 6.5 | 6.5 | 6.5 | 6.5 | 6.5 |
| CaO | 4.5 | 4.0 | 4.0 | 4.0 | 4.0 | 4.0 | 4.0 | 4.0 |
| $TiO_2$ | 1.0 | 1.7 | 1.5 | 1.2 | 0.3 | 0.3 | 0.8 | 0.8 |
| $ZrO_2$ | 2.2 | 1.7 | 1.8 | 1.7 | 1.8 | 1.8 | 1.8 | 1.8 |
| $R_2O$ | 12.3 | 11.0 | 10.9 | 11.6 | 11.8 | 13.9 | 13.4 | 13.4 |
| $Li_2O/R_2O$ | 0.20 | 0.03 | 0.16 | 0 | 0.01 | 0 | 0.02 | 0.15 |
| $Na_2O/R_2O$ | 0.33 | 0.69 | 0.29 | 0.86 | 0.80 | 0.72 | 0.75 | 0.52 |
| $K_2O/R_2O$ | 0.47 | 0.29 | 0.55 | 0.14 | 0.19 | 0.28 | 0.24 | 0.33 |
| d | 2.54 | 2.52 | 2.51 | 2.52 | 2.51 | 2.52 | 2.53 | 2.53 |
| α | 68 | 65 | 66 | 67 | 68 | 77 | 76 | 71 |
| E | 81.3 | 79.8 | 79.7 | 79.1 | 78.8 | 77.5 | 78.6 | 81.0 |
| Tg | 613 | 652 | 637 | 653 | 646 | 627 | 625 | 594 |
| $T_L$ | 1204 | 1100 | 1169 | 1100 | 1155 | 1100 | 1100 | 1100 |
| E/d | 32.1 | 31.6 | 31.7 | 31.4 | 31.4 | 30.7 | 31.1 | 32.1 |
| $T_2$ | 1636* | 1677* | 1699* | 1657* | 1683 | 1628* | 1625* | 1619* |
| $T_4$ | 1200* | 1227* | 1242* | 1209* | 1221 | 1189* | 1186* | 1179* |
| $C_R$ | 1.3* | 1.6 | 1.3 | 1.8 | 2.6 | 2.9* | 2.4* | 2.4* |
| Acid resistance | 0.09* | 0.07* | 0.07* | 0.07* | 0.04 | 0.09* | 0.09* | 0.09* |

TABLE 11

| Ex. | 81 | 82 | 83 | 84 | 85 | 86 | 87 | 88 |
|---|---|---|---|---|---|---|---|---|
| $SiO_2$ | 66.0 | 66.0 | 65.9 | 67.0 | 67.0 | 67.0 | 67.0 | 66.5 |
| $Al_2O_3$ | 7.5 | 7.5 | 7.4 | 7.5 | 7.5 | 7.5 | 7.5 | 7.7 |
| $Li_2O$ | 1.5 | 2.3 | 1.5 | 1.2 | 0.8 | 1.3 | 1.0 | 0.6 |
| $Na_2O$ | 7.0 | 7.0 | 7.0 | 7.0 | 7.0 | 7.0 | 7.0 | 8.7 |
| $K_2O$ | 4.1 | 4.6 | 3.8 | 4.3 | 4.1 | 3.6 | 4.0 | 2.2 |
| MgO | 6.5 | 6.5 | 6.4 | 7.0 | 7.0 | 7.0 | 7.0 | 7.5 |
| CaO | 4.0 | 4.0 | 4.0 | 4.0 | 4.5 | 4.5 | 4.5 | 4.0 |
| $TiO_2$ | 1.7 | 0.3 | 2.3 | 0.3 | 0.3 | 0.3 | 0.3 | 1.0 |
| $ZrO_2$ | 1.8 | 1.8 | 1.6 | 1.8 | 1.8 | 1.8 | 1.7 | 1.8 |
| $R_2O$ | 12.6 | 13.9 | 12.3 | 12.4 | 11.9 | 11.9 | 12.0 | 11.6 |
| $Li_2O/R_2O$ | 0.12 | 0.16 | 0.12 | 0.09 | 0.07 | 0.11 | 0.09 | 0.05 |
| $Na_2O/R_2O$ | 0.56 | 0.50 | 0.57 | 0.56 | 0.59 | 0.59 | 0.58 | 0.75 |
| $K_2O/R_2O$ | 0.33 | 0.33 | 0.31 | 0.34 | 0.34 | 0.30 | 0.33 | 0.19 |
| d | 2.53 | 2.52 | 2.53 | 2.52 | 2.52 | 2.52 | 2.52 | 2.53 |
| α | 70 | 72 | 68 | 69 | 69 | 68 | 69 | 67 |
| E | 80.8 | 80.5 | 80.9 | 79.8 | 79.8 | 80.6 | 79.9 | 81.0 |
| Tg | 611 | 583 | 610 | 613 | 626 | 616 | 623 | 637 |
| $T_L$ | 1100 | 1100 | 1122 | 1153 | 1144 | 1152 | 1163 | ≦1160 |
| E/d | 31.9 | 31.9 | 31.9 | 31.7 | 31.7 | 32.0 | 31.8 | 32.0 |
| $T_2$ | 1631* | 1612* | 1628* | 1651* | 1653* | 1643* | 1649* | 1627 |
| $T_4$ | 1191* | 1173* | 1188* | 1206* | 1210* | 1200* | 1205* | 1203 |
| $C_R$ | 1.6* | 3.0* | 1.5* | 2.3* | 2.4 | 2.1* | 2.1* | 1.8 |
| Acid Resistance | 0.09* | 0.09* | 0.09* | 0.08* | 0.05 | 0.08* | 0.08* | 0.06 |

TABLE 12

| Ex. | 89 | 90 | 91 | 92 | 93 | 94 | 95 | 96 |
|---|---|---|---|---|---|---|---|---|
| $SiO_2$ | 66.7 | 66.8 | 67.0 | 66.2 | 66.5 | 66.4 | 66.8 | 66.8 |
| $Al_2O_3$ | 7.7 | 7.7 | 7.6 | 7.7 | 7.7 | 7.7 | 7.7 | 7.7 |
| $Li_2O$ | 0.6 | 0.6 | 1.3 | 0.2 | 1.1 | 0.4 | 0.5 | 0.5 |
| $Na_2O$ | 8.7 | 8.7 | 9.0 | 10.0 | 8.7 | 10.0 | 10.0 | 10.0 |
| $K_2O$ | 2.2 | 2.2 | 2.0 | 0.7 | 2.2 | 0.8 | 0.8 | 0.8 |
| MgO | 7.0 | 7.0 | 6.6 | 7.5 | 7.5 | 7.5 | 7.5 | 7.5 |
| CaO | 4.5 | 4.5 | 4.0 | 4.5 | 4.0 | 4.5 | 4.5 | 4.0 |
| $TiO_2$ | 1.0 | 1.0 | 1.0 | 1.6 | 0.5 | 1.1 | 0.5 | 1.0 |
| $ZrO_2$ | 1.6 | 1.5 | 1.6 | 1.7 | 1.8 | 1.7 | 1.7 | 1.7 |
| $R_2O$ | 11.6 | 11.6 | 12.3 | 11.0 | 12.1 | 11.1 | 11.4 | 11.4 |
| $Li_2O/R_2O$ | 0.05 | 0.05 | 0.10 | 0.02 | 0.09 | 0.03 | 0.05 | 0.05 |
| $Na_2O/R_2O$ | 0.75 | 0.75 | 0.73 | 0.91 | 0.72 | 0.90 | 0.88 | 0.88 |
| $K_2O/R_2O$ | 0.19 | 0.19 | 0.16 | 0.07 | 0.18 | 0.07 | 0.07 | 0.07 |
| d | 2.53 | 2.52 | 2.52 | 2.54 | 2.53 | 2.53 | 2.53 | 2.53 |
| α | 68 | 67 | 67 | 63 | 68 | 65 | 65 | 65 |
| E | 80.6 | 79.8 | 80.1 | 81.2 | 81.5 | 81.3 | 81.3 | 80.9 |
| Tg | 635 | 635 | 617 | 653 | 618 | 645 | 638 | 639 |
| $T_L$ | 1160 | 1164 | ≦1160 | 1162 | ≦1154 | | | 1154 |
| E/d | 31.9 | 31.6 | 31.8 | 32.0 | 32.3 | 32.1 | 32.2 | 32.0 |
| $T_2$ | 1637* | 1638* | 1632* | 1621* | 1626* | 1623* | 1625* | 1630* |
| $T_4$ | 1197* | 1197* | 1187* | 1189* | 1189* | 1189* | 1189* | 1192* |
| $C_R$ | 1.7* | 1.7 | 2.2* | 1.3* | 2.0* | 1.5* | 1.9* | 1.7* |
| Acid Resistance | 0.09* | 0.07 | 0.08* | 0.09* | 0.09* | 0.09* | 0.08* | 0.08* |

TABLE 13

| Ex. | 97 | 98 | 99 | 100 | 101 | 102 | 103 | 104 |
|---|---|---|---|---|---|---|---|---|
| $SiO_2$ | 66.4 | 66.0 | 65.4 | 65.0 | 64.6 | 66.1 | 65.7 | 66.2 |
| $Al_2O_3$ | 7.7 | 7.7 | 7.7 | 7.7 | 7.7 | 7.7 | 8.0 | 8.0 |
| $Li_2O$ | 0.4 | 0.2 | 0 | 0 | 0 | 0.9 | 1.1 | 0.9 |
| $Na_2O$ | 10.0 | 10.0 | 9.8 | 9.3 | 8.8 | 10.0 | 10.0 | 10.0 |
| $K_2O$ | 0.8 | 0.7 | 0.7 | 1.0 | 1.3 | 0.5 | 0.4 | 0.5 |
| MgO | 7.5 | 7.5 | 7.5 | 7.5 | 7.5 | 7.5 | 7.5 | 7.5 |
| CaO | 4.0 | 4.0 | 4.0 | 4.0 | 4.0 | 4.0 | 4.0 | 4.0 |
| $TiO_2$ | 1.6 | 2.2 | 3.2 | 3.9 | 4.5 | 1.6 | 1.6 | 1.1 |
| $ZrO_2$ | 1.7 | 1.7 | 1.7 | 1.7 | 1.7 | 1.7 | 1.7 | 1.7 |
| $R_2O$ | 11.2 | 10.9 | 10.6 | 10.3 | 10.1 | 11.4 | 11.5 | 11.5 |
| $Li_2O/R_2O$ | 0.04 | 0.02 | 0 | 0 | 0 | 0.08 | 0.09 | 0.08 |
| $Na_2O/R_2O$ | 0.89 | 0.91 | 0.93 | 0.90 | 0.88 | 0.88 | 0.87 | 0.87 |
| $K_2O/R_2O$ | 0.07 | 0.07 | 0.07 | 0.10 | 0.12 | 0.04 | 0.04 | 0.05 |
| d | 2.53 | 2.55 | 2.54 | 2.56 | 2.56 | 2.54 | 2.54 | 2.53 |
| α | 65 | 64 | 65 | 65 | 65 | 65 | 64 | 64 |
| E | 81.2 | 81.0 | 81.2 | 81.3 | 81.3 | 81.9 | 82.4 | 81.9 |
| Tg | 643 | 661 | 653 | 668 | 671 | 635 | 631 | 637 |
| $T_L$ | ≦1151 | 1153 | 1170 | 1191 | 1220 | 1148 | 1162 | 1169 |
| E/d | 32.0 | 31.8 | 32.0 | 31.8 | 31.8 | 32.3 | 32.5 | 32.4 |
| $T_2$ | 1626* | 1624* | 1621* | 1619* | 1618* | 1609* | 1622* | |
| $T_4$ | 1191* | 1191* | 1192* | 1193* | 1193* | 1181* | 1178* | 1187* |
| $C_R$ | 1.4* | 1.1* | 0.8* | 0.6* | 0.5* | 1.4* | 1.3* | 1.4* |
| Acid Resistance | 0.09* | 0.10* | 0.10* | 0.11* | 0.12* | 0.09* | 0.10* | 0.10* |

TABLE 14

| Ex. | 105 | 106 | 107 | 108 | 109 | 110 | 111 | 112 |
|---|---|---|---|---|---|---|---|---|
| $SiO_2$ | 66.7 | 66.5 | 66.5 | 66.5 | 66.0 | 64.0 | 66.5 | 66.2 |
| $Al_2O_3$ | 8.0 | 7.5 | 7.5 | 7.5 | 7.5 | 7.5 | 7.5 | 8.5 |
| $Li_2O$ | 0.8 | 0.5 | 1.0 | 3.0 | 1.0 | 3.0 | 3.0 | 0.8 |
| $Na_2O$ | 10.0 | 7.0 | 6.5 | 4.5 | 7.0 | 7.0 | 2.5 | 10.0 |
| $K_2O$ | 0.9 | 2.5 | 2.5 | 2.5 | 2.5 | 2.5 | 4.5 | 0.9 |
| MgO | 7.5 | 7.5 | 7.5 | 7.5 | 7.5 | 7.5 | 7.5 | 7.5 |
| CaO | 4.0 | 4.0 | 4.0 | 4.0 | 4.0 | 4.0 | 4.0 | 4.0 |
| $TiO_2$ | 0.5 | 3.0 | 3.0 | 3.0 | 3.0 | 3.0 | 3.0 | 0.5 |
| $ZrO_2$ | 1.7 | 1.5 | 1.5 | 1.5 | 1.5 | 1.5 | 1.5 | 1.7 |
| $R_2O$ | 11.6 | 10.0 | 10.0 | 10.0 | 10.5 | 12.5 | 10.0 | 11.6 |
| $Li_2O/R_2O$ | 0.07 | 0.05 | 0.10 | 0.30 | 0.10 | 0.24 | 0.30 | 0.07 |
| $Na_2O/R_2O$ | 0.86 | 0.70 | 0.65 | 0.45 | 0.67 | 0.56 | 0.25 | 0.86 |
| $K_2O/R_2O$ | 0.07 | 0.25 | 0.25 | 0.25 | 0.24 | 0.20 | 0.45 | 0.07 |
| d | 2.52 | 2.53 | 2.53 | 2.53 | 2.54 | 2.55 | 2.53 | 2.53 |
| α | 64 | 63 | 64 | 59 | 65 | 66 | 63 | 63 |

TABLE 14-continued

| Ex. | 105 | 106 | 107 | 108 | 109 | 110 | 111 | 112 |
|---|---|---|---|---|---|---|---|---|
| E | 81.5 | 81.3 | 82.2 | 84.7 | 82.3 | 84.9 | 83.0 | 81.4 |
| $T_g$ | 643 | 659 | 648 | 626 | 642 | 598 | 634 | 656 |
| $T_L$ | 1150 | ≦1190 | ≦1191 | 1200 | 1151 | ≦1145 | ≧1222 | |
| E/d | 32.3 | 32.1 | 32.5 | 33.5 | 32.4 | 33.2 | 32.9 | 32.1 |
| $T_2$ | 1632* | 1654* | 1649* | 1627* | 1635* | 1557* | 1648* | 1636* |
| $T_4$ | 1193* | 1214* | 1209* | 1189* | 1199* | 1137* | 1207* | 1198* |
| $C_R$ | 1.7* | 0.9* | 0.9* | 0.9* | 0.9* | 1.4* | 0.9* | 1.4* |
| Acid Resistance | 0.09* | 0.09* | 0.09* | 0.09* | 0.09* | 0.12* | 0.09* | 0.11* |

TABLE 15

| Ex. | 113 | 114 | 115 | 116 | 117 | 118 | 119 | 120 |
|---|---|---|---|---|---|---|---|---|
| $SiO_2$ | 65.7 | 65.2 | 64.7 | 66.3 | 64.7 | 66.0 | 66.0 | 66.0 |
| $Al_2O_3$ | 9.0 | 9.5 | 10.0 | 5.5 | 5.5 | 5.5 | 5.5 | 5.5 |
| $Li_2O$ | 0.7 | 0.7 | 0.7 | 0.1 | 2.7 | 9.9 | 9.5 | 11.0 |
| $Na_2O$ | 10.0 | 10.0 | 10.0 | 10.0 | 10.0 | 4.0 | 2.5 | 0 |
| $K_2O$ | 0.9 | 0.9 | 0.9 | 1.2 | 0.2 | 3.1 | 5.0 | 6.0 |
| MgO | 7.5 | 7.5 | 7.5 | 7.5 | 7.5 | 8.0 | 8.0 | 8.0 |
| CaO | 4.0 | 4.0 | 4.0 | 6.0 | 6.0 | 0 | 0 | 0 |
| $TiO_2$ | 0.5 | 0.5 | 0.5 | 1.4 | 1.4 | 1.0 | 1.0 | 1.0 |
| $ZrO_2$ | 1.7 | 1.7 | 1.7 | 2.0 | 2.0 | 2.5 | 2.5 | 2.5 |
| $R_2O$ | 11.6 | 11.6 | 11.6 | 11.3 | 12.9 | 17.0 | 17.0 | 17.0 |
| $Li_2O/R_2O$ | 0.06 | 0.06 | 0.06 | 0.01 | 0.21 | 0.58 | 0.56 | 0.65 |
| $Na_2O/R_2O$ | 0.86 | 0.86 | 0.86 | 0.88 | 0.78 | 0.24 | 0.15 | 0 |
| $K_2O/R_2O$ | 0.07 | 0.07 | 0.07 | 0.10 | 0.01 | 0.18 | 0.29 | 0.35 |
| d | 2.53 | 2.53 | 2.53 | 2.56 | 2.57 | 2.51 | 2.51 | 2.50 |
| α | 64 | 64 | 63 | 67 | 67 | 67 | 68 | 65 |
| E | 81.8 | 82.2 | 82.3 | 78.8 | 85.4 | 86.3 | 84.3 | 83.7 |
| $T_g$ | 643 | 651 | 654 | 625 | 592 | 541 | 544 | 552 |
| $T_L$ | ≧1195 | ≧1191 | ≧1193 | | | | ≧1150 | ≧1150 |
| E/d | 32.4 | 32.5 | 32.5 | 30.8 | 33.2 | 34.3 | 33.6 | 33.5 |
| $T_2$ | 1641* | 1645* | 1649* | 1557* | 1473* | 1465* | 1489* | 1483* |
| $T_4$ | 1204* | 1208* | 1213* | 1143* | 1075* | 1041* | 1062* | 1056* |
| $C_R$ | 1.1* | 0.9* | 0.7* | 2.5* | 3.6* | 19.5 | 15.1 | 21.5 |
| Acid Resistance | 0.12* | 0.14* | 0.16* | 0.07* | 0.08* | 0.09 | 0.07* | 0.08 |

TABLE 16

| Ex. | 121 | 122 | 123 | 124 | 125 | 126 | 127 | 128 |
|---|---|---|---|---|---|---|---|---|
| $SiO_2$ | 66.0 | 64.5 | 65.4 | 65.4 | 60.0 | 66.0 | 70.0 | 62.0 |
| $Al_2O_3$ | 5.5 | 12.0 | 8.6 | 8.6 | 15.0 | 5.5 | 3.5 | 8.5 |
| $Li_2O$ | 15.3 | 12.8 | 12.5 | 12.5 | 9.0 | 10.2 | 4.0 | 5.5 |
| $Na_2O$ | 1.7 | 5.5 | 10.5 | 10.5 | 9.0 | 6.8 | 5.0 | 7.0 |
| $K_2O$ | 0 | 3.4 | 0 | 0 | 2.0 | 0 | 5.0 | 8.0 |
| MgO | 8.0 | 0 | 0 | 0 | 5.0 | 8.0 | 8.0 | 6.5 |
| CaO | 0 | 0 | 0 | 0 | 0 | 0 | 0 | 0 |
| SrO | 0 | 0 | 0 | 0 | 0 | 0 | 0 | 0 |
| BaO | 0 | 0 | 0 | 0 | 0 | 0 | 0 | 0 |
| $TiO_2$ | 1.0 | 0 | 0 | 0 | 0 | 1.0 | 3.0 | 1.0 |
| $ZrO_2$ | 2.5 | 1.8 | 3.0 | 3.0 | 0 | 2.5 | 1.5 | 1.5 |
| $R_2O$ | 17.0 | 21.7 | 23.0 | 23.0 | 20.0 | 17.0 | 14.0 | 20.5 |
| $Li_2O/R_2O$ | 0.90 | 0.59 | 0.54 | 0.54 | 0.45 | 0.60 | 0.29 | 0.27 |
| $Na_2O/R_2O$ | 0.10 | 0.25 | 0.46 | 0.46 | 0.45 | 0.40 | 0.36 | 0.34 |
| $K_2O/R_2O$ | 0 | 0.16 | 0 | 0 | 0.10 | 0 | 0.36 | 0.39 |
| d | 2.51 | 2.47 | | 2.50 | 2.46* | 2.52* | 2.49* | 2.51* |
| α | 57 | 74 | | 75 | 74* | 64* | 68* | 87* |
| E | 91.5 | 82.7 | | 85.6 | 83.2* | 87.8* | 80.1* | 77.8* |
| $T_g$ | 543 | 523 | | 504 | 550* | 543* | 564* | 525* |
| $T_L$ | ≧1050 | 1050 | | | | | | |
| E/d | 36.5 | 33.5 | | 34.2 | 33.8* | 34.8* | 32.1* | 31.0* |
| $T_2$ | 1374* | 1594 | | 1454* | 1573* | 1430* | 1598* | 1537* |
| $T_4$ | 958* | 1093 | | 998* | 1111* | 1011* | 1140* | 1102* |
| $C_R$ | 24.6 | 3.2 | 3.5 | 18.3 | 3.6 | 10.0* | 11.7* | 6.6* |
| Acid resistance | 0.07* | 0.25 | | 0.05 | 181 | 0.07* | 0.03* | 0.19* |

TABLE 17

| Ex. | 129 | 130 | 131 | 132 | 133 | 134 | 135 | 136 |
|---|---|---|---|---|---|---|---|---|
| $SiO_2$ | 63.0 | 63.0 | 63.0 | 63.2 | 60.0 | 70.0 | 68.0 | 66.0 |
| $Al_2O_3$ | 9.5 | 9.5 | 9.5 | 7.0 | 10.0 | 2.5 | 7.8 | 10.0 |
| $Li_2O$ | 0.5 | 6.0 | 6.0 | 3.0 | 7.0 | 5.0 | 1.0 | 5.0 |
| $Na_2O$ | 18.0 | 0 | 6.5 | 9.0 | 8.5 | 5.0 | 7.0 | 5.5 |
| $K_2O$ | 0 | 12.5 | 6.5 | 6.0 | 6.0 | 5.0 | 11.0 | 0 |
| MgO | 6.5 | 6.5 | 8.5 | 5.0 | 8.0 | 8.0 | 3.0 | 5.0 |
| CaO | 0 | 0 | 0 | 1.8 | 0 | 0 | 0 | 4.0 |
| SrO | 0 | 0 | 0 | 0.1 | 0 | 0 | 0 | 0 |
| BaO | 0 | 0 | 0 | 0.1 | 0 | 0 | 0 | 0 |
| $TiO_2$ | 1.0 | 1.0 | 0 | 3.0 | 0 | 3.0 | 1.0 | 3.0 |
| $ZrO_2$ | 1.5 | 1.5 | 0 | 1.8 | 0.5 | 1.5 | 1.2 | 1.5 |
| $R_2O$ | 18.5 | 18.5 | 19.0 | 18.0 | 21.5 | 15.0 | 19.0 | 10.5 |
| $Li_2O/R_2O$ | 0.03 | 0.32 | 0.32 | 0.17 | 0.33 | 0.33 | 0.05 | 0.48 |
| $Na_2O/R_2O$ | 0.97 | 0 | 0.34 | 0.50 | 0.40 | 0.33 | 0.37 | 0.52 |
| $K_2O/R_2O$ | 0 | 0.68 | 0.34 | 0.33 | 0.28 | 0.33 | 0.58 | 0 |
| d | 2.53* | 2.49* | 2.46* | 2.55* | 2.49* | 2.49* | 2.47* | 2.53* |
| α | 83* | 82* | 81* | 78* | 87* | 70* | 90* | 53* |
| E | 79.5* | 76.4* | 78.5* | 78.6* | 79.5* | 80.3* | 70.5* | 86.5* |
| Tg | 567* | 549* | 526* | 526* | 509* | 544* | 538* | 635* |
| $T_L$ | | | | | | | | |
| E/d | 31.4* | 30.7* | 32.0* | 30.8* | 32.0* | 32.2* | 28.6* | 34.2* |
| $T_2$ | 1572* | 1643* | 1557* | 1544* | 1479* | 1551* | 1739* | 1643* |
| $T_4$ | 1133* | 1189* | 1109* | 1114* | 1053* | 1099* | 1241* | 1189* |
| $C_R$ | 3.9* | 2.7* | 11.6* | 3.9* | 10.6* | 21.5* | 8.9* | 0.5* |
| Acid resistance | 0.19* | 0.19* | 0.19* | 0.13* | 0.32* | 0.02* | 0.07* | 0.13* |

TABLE 18

| Ex. | 137 | 138 |
|---|---|---|
| $SiO_2$ | 63.0 | 63.0 |
| $Al_2O_3$ | 7.5 | 7.5 |
| $Li_2O$ | 5.9 | 5.9 |
| $Na_2O$ | 11.3 | 11.3 |
| $K_2O$ | 0 | 0 |
| MgO | 6.7 | 6.7 |
| $TiO_2$ | 3.0 | 2.5 |
| $ZrO_2$ | 1.5 | 1.5 |
| $B_2O_3$ | 1.0 | 1.5 |
| $R_2O$ | 17.3 | 17.3 |
| $Li_2O/R_2O$ | 0.34 | 0.34 |
| $Na_2O/R_2O$ | 0.66 | 0.66 |
| $K_2O/R_2O$ | 0 | 0 |
| d | 2.53 | 2.52 |
| α | 71 | 70 |
| E | 84.2 | 83.8 |
| Tg | 543 | 541 |
| $T_L$ | | |
| E/d | 33.3 | 33.2 |
| $T_2$ | 1473* | 1472* |
| $T_4$ | 1044* | 1040* |
| $C_R$ | 5* | 5* |
| Acid resistance | 0.14* | 0.14* |

TABLE 19

| Ex. | 1 | 2 | 3 | 4 | 5 | 6 | 7 | 8 |
|---|---|---|---|---|---|---|---|---|
| $SiO_2$ | 64.7 | 63.8 | 65.4 | 64.3 | 63.1 | 61.7 | 63.3 | 63.0 |
| $Al_2O_3$ | 9.2 | 9.0 | 9.3 | 9.1 | 10.7 | 12.3 | 9.0 | 8.9 |
| $Li_2O$ | 4.1 | 4.0 | 4.1 | 4.1 | 4.1 | 4.0 | 2.6 | 3.1 |
| $Na_2O$ | 4.0 | 4.0 | 4.1 | 4.0 | 5.0 | 5.0 | 6.8 | 3.9 |
| $K_2O$ | 7.1 | 7.0 | 7.1 | 7.0 | 7.0 | 6.9 | 6.9 | 9.7 |
| MgO | 5.3 | 5.2 | 5.3 | 5.2 | 5.2 | 5.2 | 5.1 | 5.1 |
| $TiO_2$ | 2.6 | 0 | 4.6 | 1.3 | 0 | 0 | 1.3 | 1.3 |
| $ZrO_2$ | 3.0 | 6.9 | 0 | 5.0 | 5.0 | 4.9 | 4.9 | 4.9 |

TABLE 20

| Ex. | 9 | 10 | 11 | 12 | 13 | 14 | 15 | 16 |
|---|---|---|---|---|---|---|---|---|
| $SiO_2$ | 63.4 | 66.1 | 63.0 | 63.0 | 65.9 | 64.7 | 63.6 | 63.0 |
| $Al_2O_3$ | 9.0 | 9.1 | 8.9 | 8.9 | 9.3 | 9.2 | 9.0 | 8.9 |
| $Li_2O$ | 2.4 | 3.6 | 2.7 | 4.0 | 4.2 | 2.5 | 1.6 | 1.6 |
| $Na_2O$ | 7.9 | 3.5 | 5.6 | 0.0 | 8.8 | 12.0 | 11.8 | 10.0 |
| $K_2O$ | 5.9 | 6.2 | 8.5 | 12.7 | 0.0 | 0.0 | 2.6 | 5.1 |
| MgO | 5.2 | 5.2 | 5.1 | 5.1 | 5.4 | 5.3 | 5.2 | 5.1 |
| $TiO_2$ | 1.3 | 1.3 | 1.3 | 1.3 | 1.3 | 1.3 | 1.3 | 1.3 |
| $ZrO_2$ | 4.9 | 5.0 | 4.9 | 4.9 | 5.1 | 5.0 | 4.9 | 4.9 |

TABLE 21

| Ex. | 17 | 18 | 19 | 20 | 21 | 22 | 23 | 24 |
|---|---|---|---|---|---|---|---|---|
| $SiO_2$ | 63.6 | 62.4 | 62.8 | 61.8 | 62.2 | 61.6 | 61.9 | 62.4 |
| $Al_2O_3$ | 9.0 | 9.1 | 12.5 | 12.5 | 12.6 | 14.1 | 12.5 | 12.6 |
| $Li_2O$ | 0.8 | 4.6 | 3.9 | 3.2 | 2.9 | 4.1 | 3.8 | 2.9 |
| $Na_2O$ | 15.2 | 4.5 | 11.1 | 11.4 | 11.6 | 10.1 | 10.1 | 11.6 |
| $K_2O$ | 0.0 | 7.9 | 0.0 | 0.0 | 0.0 | 0.9 | 1.0 | 0.0 |
| MgO | 5.2 | 5.2 | 4.6 | 6.0 | 6.8 | 3.9 | 5.0 | 6.8 |
| $TiO_2$ | 1.3 | 1.3 | 0.0 | 0.0 | 0.0 | 3.2 | 2.6 | 0.7 |
| $ZrO_2$ | 4.9 | 5.0 | 5.0 | 5.0 | 4.0 | 2.0 | 3.0 | 3.0 |

TABLE 22

| Ex. | 25 | 26 | 27 | 28 | 29 | 30 | 31 | 32 |
|---|---|---|---|---|---|---|---|---|
| $SiO_2$ | 62.6 | 62.8 | 61.8 | 61.4 | 61.0 | 67.9 | 61.4 | 63.0 |
| $Al_2O_3$ | 12.6 | 12.7 | 12.5 | 12.4 | 12.3 | 9.1 | 8.7 | 8.9 |
| $Li_2O$ | 2.9 | 2.9 | 2.9 | 2.9 | 2.9 | 3.1 | 0.8 | 0.0 |
| $Na_2O$ | 11.6 | 11.7 | 11.5 | 11.4 | 11.3 | 3.1 | 8.2 | 16.8 |
| $K_2O$ | 0.0 | 0.0 | 0.0 | 0.0 | 0.0 | 5.4 | 9.9 | 0.0 |
| MgO | 6.8 | 6.8 | 5.7 | 5.0 | 4.4 | 5.2 | 5.0 | 5.1 |
| $TiO_2$ | 1.3 | 2.0 | 2.6 | 3.9 | 5.1 | 1.3 | 1.2 | 1.3 |
| $ZrO_2$ | 2.0 | 1.0 | 3.0 | 3.0 | 3.0 | 5.0 | 4.8 | 4.9 |

TABLE 23

| Ex. | 33 | 34 | 35 | 36 | 37 | 38 | 39 | 40 |
|---|---|---|---|---|---|---|---|---|
| $SiO_2$ | 60.4 | 61.7 | 59.2 | 60.4 | 63.0 | 63.4 | 62.2 | 62.8 |
| $Al_2O_3$ | 8.5 | 8.7 | 8.4 | 8.5 | 17.9 | 16.3 | 18.1 | 16.7 |
| $Li_2O$ | 0.0 | 0.0 | 0.0 | 1.9 | 1.4 | 0.0 | 2.3 | 2.3 |
| $Na_2O$ | 8.0 | 12.3 | 3.9 | 0.0 | 13.3 | 13.9 | 12.0 | 12.1 |
| $K_2O$ | 12.2 | 6.2 | 17.9 | 18.3 | 0.0 | 0.0 | 0.0 | 0.0 |
| MgO | 4.9 | 5.0 | 4.8 | 4.9 | 4.3 | 6.4 | 5.3 | 6.1 |
| $TiO_2$ | 1.2 | 1.2 | 1.2 | 1.2 | 0.0 | 0.0 | 0.0 | 0.0 |
| $ZrO_2$ | 4.7 | 4.8 | 4.6 | 4.7 | 0.0 | 0.0 | 0.0 | 0.0 |

TABLE 24

| Ex. | 41 | 42 | 43 | 44 | 45 | 46 | 47 | 48 |
|---|---|---|---|---|---|---|---|---|
| $SiO_2$ | 63.2 | 63.4 | 63.0 | 63.5 | 63.3 | 62.9 | 61.8 | 63.0 |
| $Al_2O_3$ | 15.9 | 15.8 | 15.9 | 15.3 | 15.4 | 15.8 | 16.4 | 13.4 |
| $Li_2O$ | 2.4 | 1.9 | 2.0 | 2.6 | 2.7 | 2.7 | 2.8 | 2.8 |
| $Na_2O$ | 11.7 | 12.2 | 12.5 | 11.8 | 11.8 | 11.8 | 11.4 | 11.7 |
| $K_2O$ | 0.0 | 0.0 | 0.0 | 0.0 | 0.0 | 0.0 | 0.0 | 0.0 |
| MgO | 6.8 | 6.7 | 6.7 | 6.8 | 6.8 | 6.8 | 4.7 | 6.1 |
| $TiO_2$ | 0.0 | 0.0 | 0.0 | 0.0 | 0.0 | 0.0 | 0.0 | 0.0 |
| $ZrO_2$ | 0.0 | 0.0 | 0.0 | 0.0 | 0.0 | 0.0 | 3.0 | 3.0 |

TABLE 25

| Ex. | 49 | 50 | 51 | 52 | 53 | 54 | 55 | 56 |
|---|---|---|---|---|---|---|---|---|
| $SiO_2$ | 59.5 | 59.4 | 59.4 | 59.6 | 58.7 | 60.0 | 59.2 | 59.3 |
| $Al_2O_3$ | 14.2 | 14.2 | 14.2 | 14.2 | 14.0 | 14.3 | 14.1 | 14.2 |
| $Li_2O$ | 1.2 | 1.4 | 1.6 | 1.4 | 1.4 | 1.4 | 1.4 | 1.4 |
| $Na_2O$ | 4.3 | 4.3 | 4.3 | 3.4 | 0.9 | 3.9 | 4.3 | 2.4 |
| $K_2O$ | 7.3 | 8.0 | 8.7 | 7.3 | 11.5 | 5.9 | 6.5 | 8.7 |
| MgO | 4.1 | 4.0 | 4.0 | 4.1 | 4.0 | 4.4 | 4.3 | 4.2 |
| CaO | 4.8 | 3.9 | 3.0 | 4.8 | 4.3 | 4.8 | 2.6 | 4.5 |
| $TiO_2$ | 1.9 | 1.9 | 1.9 | 2.5 | 2.4 | 2.5 | 3.7 | 2.5 |
| $ZrO_2$ | 2.9 | 2.9 | 2.9 | 2.9 | 2.8 | 2.9 | 3.8 | 2.9 |

TABLE 26

| Ex. | 57 | 58 | 59 | 60 | 61 | 62 | 63 | 64 |
|---|---|---|---|---|---|---|---|---|
| $SiO_2$ | 58.9 | 58.2 | 57.0 | 56.8 | 59.3 | 58.2 | 59.7 | 58.1 |
| $Al_2O_3$ | 14.1 | 14.1 | 14.8 | 14.0 | 11.0 | 13.9 | 14.3 | 13.9 |
| $Li_2O$ | 1.6 | 1.8 | 1.8 | 1.6 | 1.6 | 1.6 | 1.6 | 0.7 |
| $Na_2O$ | 2.4 | 2.4 | 2.4 | 2.4 | 2.4 | 2.3 | 2.4 | 2.3 |
| $K_2O$ | 8.7 | 8.7 | 9.4 | 8.6 | 8.7 | 8.6 | 8.8 | 8.5 |
| MgO | 4.3 | 4.7 | 4.6 | 4.3 | 4.4 | 3.1 | 4.4 | 4.3 |
| CaO | 2.6 | 2.6 | 2.6 | 2.6 | 2.6 | 2.5 | 2.6 | 2.5 |
| $TiO_2$ | 3.7 | 3.7 | 3.7 | 6.1 | 6.2 | 6.0 | 6.2 | 6.0 |
| $ZrO_2$ | 3.8 | 3.8 | 3.8 | 3.8 | 3.8 | 3.7 | 0.0 | 3.7 |

TABLE 27

| Ex. | 65 | 66 | 67 | 68 | 69 | 70 | 71 | 72 |
|---|---|---|---|---|---|---|---|---|
| $SiO_2$ | 58.6 | 59.2 | 61.6 | 61.4 | 61.1 | 61.3 | 61.3 | 61.3 |
| $Al_2O_3$ | 14.0 | 14.1 | 11.1 | 11.1 | 12.5 | 12.5 | 11.9 | 11.8 |
| $Li_2O$ | 1.6 | 1.6 | 1.6 | 1.6 | 1.4 | 1.4 | 1.6 | 1.4 |
| $Na_2O$ | 0.5 | 2.4 | 2.4 | 2.4 | 3.4 | 3.4 | 2.3 | 3.4 |
| $K_2O$ | 8.6 | 5.8 | 8.8 | 8.8 | 7.3 | 7.4 | 8.2 | 8.4 |
| MgO | 4.3 | 4.3 | 4.4 | 3.7 | 3.7 | 3.7 | 3.7 | 4.0 |
| CaO | 2.6 | 2.6 | 2.6 | 2.6 | 2.6 | 2.6 | 2.6 | 3.0 |
| $TiO_2$ | 6.1 | 6.1 | 3.7 | 5.6 | 4.7 | 4.8 | 5.6 | 2.5 |
| $ZrO_2$ | 3.8 | 3.8 | 3.8 | 2.9 | 3.3 | 2.9 | 2.9 | 4.2 |

TABLE 28

| Ex. | 73 | 74 | 75 | 76 | 77 | 78 | 79 | 80 |
|---|---|---|---|---|---|---|---|---|
| $SiO_2$ | 61.3 | 63.1 | 63.0 | 63.5 | 64.1 | 61.5 | 61.7 | 61.9 |
| $Al_2O_3$ | 11.8 | 11.9 | 11.8 | 12.0 | 12.0 | 11.9 | 11.9 | 11.9 |
| $Li_2O$ | 1.2 | 0.1 | 0.8 | 0.0 | 0.1 | 0.0 | 0.1 | 0.9 |
| $Na_2O$ | 3.8 | 7.3 | 3.0 | 9.7 | 9.1 | 9.6 | 9.6 | 6.8 |
| $K_2O$ | 8.5 | 4.6 | 8.7 | 2.5 | 3.3 | 5.7 | 4.7 | 6.5 |
| MgO | 4.1 | 4.1 | 4.0 | 4.1 | 4.1 | 4.1 | 4.1 | 4.1 |
| CaO | 3.9 | 3.5 | 3.5 | 3.5 | 3.5 | 3.5 | 3.5 | 3.5 |
| $TiO_2$ | 1.2 | 2.1 | 1.9 | 1.5 | 0.4 | 0.4 | 1.0 | 1.0 |
| $ZrO_2$ | 4.2 | 3.4 | 3.3 | 3.4 | 3.4 | 3.3 | 3.4 | 3.4 |

TABLE 29

| Ex. | 81 | 82 | 83 | 84 | 85 | 86 | 87 | 88 |
|---|---|---|---|---|---|---|---|---|
| $SiO_2$ | 61.7 | 62.0 | 61.7 | 62.8 | 62.8 | 63.1 | 62.9 | 62.7 |
| $Al_2O_3$ | 11.9 | 12.0 | 11.8 | 11.9 | 11.9 | 12.0 | 12.0 | 12.2 |
| $Li_2O$ | 0.7 | 1.1 | 0.7 | 0.5 | 0.4 | 0.6 | 0.5 | 0.3 |
| $Na_2O$ | 6.7 | 6.8 | 6.8 | 6.8 | 6.8 | 6.8 | 6.8 | 8.5 |
| $K_2O$ | 6.1 | 6.8 | 5.6 | 6.3 | 6.0 | 5.4 | 5.8 | 3.3 |
| MgO | 4.1 | 4.1 | 4.0 | 4.4 | 4.4 | 4.4 | 4.4 | 4.7 |
| CaO | 3.5 | 3.5 | 3.5 | 3.5 | 3.9 | 4.0 | 3.9 | 3.5 |
| $TiO_2$ | 2.1 | 0.4 | 2.9 | 0.4 | 0.4 | 0.4 | 0.4 | 1.3 |
| $ZrO_2$ | 3.4 | 3.4 | 3.1 | 3.4 | 3.4 | 3.4 | 3.3 | 3.4 |

TABLE 30

| Ex. | 89 | 90 | 91 | 92 | 93 | 94 | 95 | 96 |
|---|---|---|---|---|---|---|---|---|
| $SiO_2$ | 62.9 | 63.1 | 63.4 | 62.7 | 63.0 | 63.1 | 63.6 | 63.5 |
| $Al_2O_3$ | 12.3 | 12.3 | 12.2 | 12.3 | 12.3 | 12.3 | 12.4 | 12.3 |
| $Li_2O$ | 0.3 | 0.3 | 0.6 | 0.1 | 0.5 | 0.2 | 0.3 | 0.3 |
| $Na_2O$ | 8.5 | 8.5 | 8.8 | 9.8 | 8.5 | 9.8 | 9.8 | 9.8 |
| $K_2O$ | 3.3 | 3.3 | 3.0 | 1.1 | 3.3 | 1.1 | 1.2 | 1.2 |
| MgO | 4.4 | 4.4 | 4.2 | 4.8 | 4.8 | 4.8 | 4.8 | 4.8 |
| CaO | 4.0 | 4.0 | 3.5 | 4.0 | 3.5 | 4.0 | 4.0 | 3.5 |
| $TiO_2$ | 1.3 | 1.3 | 1.2 | 2.0 | 0.6 | 1.4 | 0.6 | 1.3 |
| $ZrO_2$ | 3.1 | 2.9 | 3.1 | 3.3 | 3.4 | 3.3 | 3.3 | 3.3 |

TABLE 31

| Ex. | 97 | 98 | 99 | 100 | 101 | 102 | 103 | 104 |
|---|---|---|---|---|---|---|---|---|
| $SiO_2$ | 62.9 | 62.4 | 61.6 | 61.0 | 60.4 | 62.9 | 62.5 | 63.0 |
| $Al_2O_3$ | 12.3 | 12.3 | 12.2 | 12.2 | 12.1 | 12.4 | 12.9 | 12.9 |
| $Li_2O$ | 0.2 | 0.1 | 0.0 | 0.0 | 0.0 | 0.1 | 0.5 | 0.4 |
| $Na_2O$ | 9.8 | 9.8 | 9.6 | 9.0 | 8.5 | 9.8 | 9.8 | 9.8 |
| $K_2O$ | 1.2 | 1.1 | 1.1 | 1.5 | 1.8 | 0.7 | 0.6 | 0.8 |
| MgO | 4.8 | 4.8 | 4.7 | 4.7 | 4.7 | 4.8 | 4.8 | 4.8 |
| CaO | 3.5 | 3.5 | 3.5 | 3.5 | 3.5 | 3.6 | 3.6 | 3.6 |
| $TiO_2$ | 2.0 | 2.8 | 4.0 | 4.8 | 5.6 | 2.0 | 2.0 | 1.4 |
| $ZrO_2$ | 3.3 | 3.3 | 3.3 | 3.3 | 3.3 | 3.3 | 3.3 | 3.3 |

TABLE 32

| Ex. | 105 | 106 | 107 | 108 | 109 | 110 | 111 | 112 |
|---|---|---|---|---|---|---|---|---|
| $SiO_2$ | 63.4 | 62.5 | 62.6 | 63.3 | 62.2 | 60.8 | 62.6 | 62.7 |
| $Al_2O_3$ | 12.9 | 12.0 | 12.0 | 12.1 | 12.0 | 12.1 | 12.0 | 13.7 |
| $Li_2O$ | 0.4 | 0.2 | 0.5 | 1.4 | 0.5 | 1.4 | 1.4 | 0.4 |
| $Na_2O$ | 9.8 | 6.8 | 6.3 | 4.4 | 6.8 | 6.9 | 2.4 | 9.8 |
| $K_2O$ | 1.3 | 3.7 | 3.7 | 3.7 | 3.7 | 3.7 | 6.6 | 1.3 |
| MgO | 4.8 | 4.7 | 4.7 | 4.8 | 4.7 | 4.8 | 4.7 | 4.8 |
| CaO | 3.5 | 3.5 | 3.5 | 3.6 | 3.5 | 3.5 | 3.5 | 3.5 |
| $TiO_2$ | 0.6 | 3.7 | 3.8 | 3.8 | 3.8 | 3.8 | 3.8 | 0.6 |
| $ZrO_2$ | 3.3 | 2.9 | 2.9 | 2.9 | 2.9 | 2.9 | 2.9 | 3.3 |

TABLE 33

| Ex. | 113 | 114 | 115 | 116 | 117 | 118 | 119 | 120 |
|---|---|---|---|---|---|---|---|---|
| $SiO_2$ | 62.0 | 61.4 | 60.7 | 63.5 | 63.1 | 65.3 | 64.5 | 64.7 |
| $Al_2O_3$ | 14.4 | 15.2 | 15.9 | 8.9 | 9.1 | 9.2 | 9.1 | 9.1 |
| $Li_2O$ | 0.3 | 0.3 | 0.3 | 0.1 | 1.3 | 4.9 | 4.6 | 5.4 |
| $Na_2O$ | 9.7 | 9.7 | 9.7 | 9.9 | 10.1 | 4.1 | 2.5 | 0.0 |
| $K_2O$ | 1.3 | 1.3 | 1.3 | 1.7 | 0.3 | 4.8 | 7.7 | 9.2 |
| MgO | 4.7 | 4.7 | 4.7 | 4.8 | 4.9 | 5.3 | 5.2 | 5.3 |
| CaO | 3.5 | 3.5 | 3.5 | 5.4 | 5.5 | 0.0 | 0.0 | 0.0 |
| $TiO_2$ | 0.6 | 0.6 | 0.6 | 1.8 | 1.8 | 1.3 | 1.3 | 1.3 |
| $ZrO_2$ | 3.3 | 3.3 | 3.3 | 3.9 | 4.0 | 5.1 | 5.0 | 5.0 |

TABLE 34

| Ex. | 121 | 122 | 123 | 124 | 125 | 126 | 127 | 128 |
|---|---|---|---|---|---|---|---|---|
| $SiO_2$ | 68.4 | 60.9 | 63.4 | 63.4 | 56.8 | 66.4 | 67.7 | 57.6 |
| $Al_2O_3$ | 9.7 | 19.2 | 14.1 | 14.1 | 24.1 | 9.4 | 5.7 | 13.4 |
| $Li_2O$ | 7.9 | 6.0 | 6.0 | 6.0 | 4.2 | 5.1 | 1.9 | 2.5 |
| $Na_2O$ | 1.8 | 5.4 | 10.5 | 10.5 | 8.8 | 7.1 | 5.0 | 6.7 |
| $K_2O$ | 0.0 | 5.0 | 0.0 | 0.0 | 3.0 | 0.0 | 7.6 | 11.6 |
| MgO | 5.6 | 0.0 | 0.0 | 0.0 | 3.2 | 5.4 | 5.2 | 4.0 |
| CaO | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 |
| $TiO_2$ | 1.4 | 0.0 | 0.0 | 0.0 | 0.0 | 1.3 | 3.9 | 1.2 |
| $ZrO_2$ | 5.3 | 3.5 | 6.0 | 6.0 | 0.0 | 5.2 | 3.0 | 2.9 |

TABLE 35

| Ex. | 129 | 130 | 131 | 132 | 133 | 134 | 135 | 136 |
|---|---|---|---|---|---|---|---|---|
| $SiO_2$ | 59.0 | 57.0 | 60.2 | 58.3 | 57.1 | 68.5 | 60.7 | 62.7 |
| $Al_2O_3$ | 15.1 | 14.6 | 15.4 | 11.0 | 16.2 | 4.2 | 11.8 | 16.1 |
| $Li_2O$ | 0.2 | 2.7 | 2.8 | 1.4 | 3.3 | 2.4 | 0.4 | 2.4 |
| $Na_2O$ | 17.4 | 0.0 | 6.4 | 8.6 | 8.3 | 5.0 | 6.4 | 5.4 |
| $K_2O$ | 0.0 | 17.7 | 9.7 | 8.7 | 9.0 | 7.7 | 15.4 | 0.0 |
| MgO | 4.1 | 3.9 | 5.4 | 3.1 | 5.1 | 5.3 | 1.8 | 3.2 |
| CaO | 0.0 | 0.0 | 0.0 | 1.5 | 0.0 | 0.0 | 0.0 | 3.5 |
| SrO | 0.0 | 0.0 | 0.0 | 0.2 | 0.0 | 0.0 | 0.0 | 0.0 |
| BaO | 0.0 | 0.0 | 0.0 | 0.2 | 0.0 | 0.0 | 0.0 | 0.0 |
| $TiO_2$ | 1.2 | 1.2 | 0.0 | 3.7 | 0.0 | 3.9 | 1.2 | 3.8 |
| $ZrO_2$ | 2.9 | 2.8 | 0.0 | 3.4 | 1.0 | 3.0 | 2.2 | 2.9 |

TABLE 36

| Ex. | 137 | 138 |
|---|---|---|
| $SiO_2$ | 61.1 | 61.1 |
| $Al_2O_3$ | 12.3 | 12.4 |
| $Li_2O$ | 2.9 | 2.9 |
| $Na_2O$ | 11.4 | 11.4 |
| $K_2O$ | 0.0 | 0.0 |
| MgO | 4.4 | 4.4 |
| $TiO_2$ | 3.9 | 3.2 |
| $ZrO_2$ | 3.0 | 3.0 |
| $B_2O_3$ | 1.1 | 1.7 |

INDUSTRIAL APPLICABILITY

The glass of the present invention can be used for a glass substrate for a magnetic disk.

The entire disclosures of Japanese Patent Application No. 2009-090104 filed on Apr. 2, 2009 and Japanese Patent Application No. 2010-030190 filed on Feb. 15, 2010 including specifications, claims, drawings and summaries are incorporated herein by reference in their entireties.

What is claimed is:

1. Glass for an information recording medium substrate, which comprises, as represented by mol % based on the following oxides, from 61 to 72% of $SiO_2$, from 3 to 11% of $Al_2O_3$, from 0 to 14.3% of $Li_2O$, from 0 to 22% of $Na_2O$, from 0 to 22% of $K_2O$, from 4 to 13% of MgO, from 0 to 6% of $TiO_2$ and from 0 to 5% of $ZrO_2$,
provided that the total content of $Li_2O$, $Na_2O$ and $K_2O$ ($R_2O$) is from 10 to 22%, and
(a) the ratio of the content of $Li_2O$ to $R_2O$ ($Li_2O/R_2O$) is at most 0.52, (b) the ratio of the content of $Na_2O$ to $R_2O$ ($Na_2O/R_2O$) is at least 0.35, or (c) the ratio of the content of $K_2O$ to $R_2O$ ($K_2O/R_2O$) is at least 0.45.

2. The glass for an information recording medium substrate according to claim 1, wherein the ratio of $Li_2O/R_2O$ is at most 0.5, or the ratio of $Na_2O/R_2O$ is at least 0.4.

3. The glass for an information recording medium substrate according to claim 1, which contains no $B_2O_3$ or contains less than 1% of $B_2O_3$.

4. The glass for an information recording medium substrate according to claim 1, wherein $SiO_2$ is from 62 to 71%, $Al_2O_3$ is from 4 to 11%, $Li_2O$ is from 0 to 12.4%, $Na_2O$ is from 0 to 20%, $K_2O$ is from 0 to 19%, MgO is from 5 to 12%, $TiO_2$ is from 0 to 5%, $ZrO_2$ is from 0 to 4%, and $R_2O$ is from 11 to 20%.

5. The glass for an information recording medium substrate according to claim 1, wherein $SiO_2$ is from 63 to 70%, $Al_2O_3$ is from 5 to 9%, $Li_2O$ is from 0 to 10.2%, $Na_2O$ is from 0 to 19%, $K_2O$ is from 0 to 12.8%, MgO is from 5 to 11%, $TiO_2$ is from 0 to 4%, $ZrO_2$ is from 0 to 4%, and $R_2O$ is from 13 to 19%.

6. The glass for an information recording medium substrate according claim 1, which contains neither CaO, SrO nor BaO.

7. The glass for an information recording medium substrate according to claim 1, which contains at least one of CaO, SrO and BaO in the total content of at most 3%.

8. The glass for an information recording medium substrate according to claim 1, wherein, $Li_2O$ is from 0 to less than 5%, $Na_2O$ is from 0 to 13%, $K_2O$ is from 0 to 12%, MgO is from 4 to 11%, $R_2O$ is from 10 to 17%, and CaO is up to 3%.

9. The glass for an information recording medium substrate according to claim 1, wherein $SiO_2$ is from 61 to 71%, $Al_2O_3$ is from 4 to 11%, $Li_2O$ is from 0 to 4.5%, $Na_2O$ is from 0 to 12%, $K_2O$ is from 0 to 10%, MgO is from 4 to 9%, and CaO is up to 3%.

10. The glass for an information recording medium substrate according to claim 8, wherein $ZrO_2$ is from 0.5 to 3%.

11. The glass for an information recording medium substrate according to claim 1, which has a Young's modulus of at least 76 GPa and a specific modulus of at least 28 MNm/kg.

12. The glass for an information recording medium substrate according to claim 1, which has a glass transition temperature of at least 500° C.

13. The glass for an information recording medium substrate according to claim 8, which has a Young's modulus of at least 76 GPa, a specific modulus of at least 30 MNm/kg and a glass transition temperature of at least 510° C.

14. The glass for an information recording medium substrate according to claim 1, which has an average linear expansion coefficient of at least $56 \times 10^{-7}$/° C. in a temperature range of from −50 to 70° C.

15. The glass for an information recording medium substrate according to claim 1, wherein $(T_L - T_4) < 50°$ C., where $T_L$ is the liquidus temperature, and $T_4$ is the temperature at which the viscosity becomes $10^4$ dPa·s.

16. The glass for an information recording medium substrate according to claim 1, which has a density of at most 2.60 g/cm$^3$.

17. A glass substrate for an information recording medium, which is made of the glass for an information recording medium substrate as defined in claim 1.

18. The glass substrate for an information recording medium according to claim 17, wherein when immersed in 0.01 N nitric acid at 25° C., the etching rate of glass is at most 0.2 nm/h.

19. The glass substrate for an information recording medium according to claim 17, wherein when the glass is left under a steam atmosphere at 120° C. at 0.2 MPa for 20 hours, $C_R=C_{Li}+C_{Na}+C_K$ is at most 12 nmol/cm$^2$, where $C_{Li}$, $C_{Na}$ and $C_K$ are the amounts of Li, Na and K which precipitate on a surface of the glass, respectively.

20. A magnetic disk having a magnetic recording layer formed on the glass substrate for an information recording medium as defined in claim 17, 18 or 19.

* * * * *